US012453669B2

(12) United States Patent
Kaiser et al.

(10) Patent No.: US 12,453,669 B2
(45) Date of Patent: Oct. 28, 2025

(54) SYSTEMS AND METHODS FOR SUPPORTING AND STABILIZING A PATIENT DURING HIP DISTRACTION

(71) Applicant: Stryker Corporation, Kalamazoo, MI (US)

(72) Inventors: William Kaiser, Campbell, CA (US); Christina Lagarto, Sunnyvale, CA (US); Conrad Smith, Hollister, CA (US); Nicolas Olivares, Centennial, CO (US); Ian Kovacevich, Carlsbad, CA (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/766,561

(22) Filed: Jul. 8, 2024

(65) Prior Publication Data

US 2024/0358573 A1 Oct. 31, 2024

Related U.S. Application Data

(63) Continuation of application No. 18/161,851, filed on Jan. 30, 2023, which is a continuation of application (Continued)

(51) Int. Cl.

*A61G 13/00* (2006.01)
*A61G 13/04* (2006.01)
*A61G 13/12* (2006.01)

(52) U.S. Cl.

CPC .......... *A61G 13/0081* (2016.11); *A61G 13/04* (2013.01); *A61G 13/123* (2013.01); *A61G 13/126* (2013.01)

(58) Field of Classification Search

CPC ................ A61G 13/00; A61G 13/0036; A61G 13/0081; A61G 13/04; A61G 13/12; A61G 13/123; A61G 13/126

See application file for complete search history.

(56) References Cited

U.S. PATENT DOCUMENTS 2,150,314 A 3/1939 Bell
D130,079 S 10/1941 Weller (Continued)

FOREIGN PATENT DOCUMENTS

DE 102005023477 A1 11/2006
DE 202009003314 U1 5/2009

(Continued)

OTHER PUBLICATIONS

Intention to Grant dated Sep. 25, 2024, directed to EP Application No. 18 747 256.8; 8 pages.

(Continued)

*Primary Examiner* — Fredrick C Conley
(74) *Attorney, Agent, or Firm* — Morrison & Foerster LLP

(57) ABSTRACT

A method for hip distraction includes positioning a patient on a slide-resisting pad placed on a surgical table; tilting the surgical table so that the patient is in a first degree of inclination; applying a distraction force to a leg of the patient while the patient is in the first degree of inclination so that a hip joint of the patient is distracted, wherein the distraction force is opposed by a combination of a slide-resisting friction force provided by the slide-resisting pad and a gravitational force attributable to the first degree of inclination; reducing the tilt of the surgical table in accordance with a reduction of the distraction force over time so that the patient is in a second degree of inclination; and performing at least a portion of a surgical procedure on the distracted hip joint while the patient is in the second degree of inclination.

21 Claims, 33 Drawing Sheets

Related U.S. Application Data

No. 17/488,213, filed on Sep. 28, 2021, now Pat. No. 11,564,855.

(60) Provisional application No. 63/148,597, filed on Feb. 11, 2021, provisional application No. 63/084,494, filed on Sep. 28, 2020.

(56) References Cited

U.S. PATENT DOCUMENTS 2,477,562 A 8/1949 Roger
D171,677 S 3/1954 Adler
2,732,269 A 1/1956 Astroff
3,220,022 A 11/1965 Ted
D221,035 S 6/1971 Raines
3,745,996 A 7/1973 Rush
3,808,644 A 5/1974 Schoch
D264,531 S 5/1982 Trode
4,539,763 A 9/1985 Walkhoff
4,551,932 A 11/1985 Schoch
4,573,482 A 3/1986 Williams, Jr.
4,708,510 A 11/1987 Mcconnell et al.
4,835,886 A 6/1989 Chemello et al.
4,841,650 A 6/1989 Dodge et al.
4,865,303 A 9/1989 Hall
5,052,128 A 10/1991 Lonardo
5,162,039 A 11/1992 Dahners
5,177,882 A 1/1993 Berger
5,249,377 A 10/1993 Walkhoff
5,287,575 A 2/1994 Allen et al.
5,306,231 A 4/1994 Cullum et al.
5,560,577 A 10/1996 Keselman
5,582,379 A 12/1996 Keselman et al.
5,608,934 A 3/1997 Torrie et al.
D385,040 S 10/1997 Keselman
D387,581 S 12/1997 Parker et al.
5,702,389 A 12/1997 Taylor et al.
D389,580 S 1/1998 Keselman et al.
5,728,095 A 3/1998 Taylor et al.
5,819,440 A 10/1998 Okajima
5,918,330 A 7/1999 Navarro et al.
5,971,984 A 10/1999 Taylor et al.
6,109,625 A 8/2000 Hewitt
6,162,223 A 12/2000 Orsak et al.
6,286,164 B1 9/2001 Lamb et al.
6,295,671 B1 10/2001 Reesby
6,678,908 B2 1/2004 Borders et al.
D546,599 S 7/2007 Goldberg
7,237,556 B2 7/2007 Smothers et al.
7,337,483 B2 3/2008 Boucher et al.
7,343,635 B2 3/2008 Jackson
7,477,926 B2 1/2009 Mccombs
7,520,007 B2 4/2009 Skripps
7,520,008 B2 4/2009 Wong et al.
7,565,708 B2 7/2009 Jackson
7,572,292 B2 8/2009 Crabtree et al.
7,591,050 B2 9/2009 Hammerslag
7,600,281 B2 10/2009 Skripps
7,669,262 B2 3/2010 Skripps et al.
7,677,249 B2 3/2010 Kong et al.
7,739,762 B2 6/2010 Lamb et al.
RE41,412 E 7/2010 Van Steenburg
7,762,975 B2 7/2010 Memminger
7,832,401 B2 11/2010 Torrie et al.
7,862,570 B2 1/2011 Russell et al.
7,878,992 B2 2/2011 Mitsuishi et al.
7,882,583 B2 2/2011 Skripps
7,947,006 B2 5/2011 Torrie et al.
7,949,006 B2 5/2011 Jagadesan et al.
7,949,386 B2 5/2011 Buly et al.
7,979,932 B2 7/2011 Liang
8,011,045 B2 9/2011 Skripps
8,037,884 B2 10/2011 Weinstein et al.
8,055,487 B2 11/2011 James
8,060,960 B2 11/2011 Jackson
8,109,942 B2 2/2012 Carson
8,152,816 B2 4/2012 Tuma et al.
D665,912 S 8/2012 Skripps
8,234,730 B2 8/2012 Skripps
8,234,731 B2 8/2012 Skripps
8,256,050 B2 9/2012 Wong et al.
8,281,434 B2 10/2012 Skripps
8,322,342 B2 12/2012 Soto et al.
8,388,553 B2 3/2013 James et al.
8,397,323 B2 3/2013 Skripps et al.
8,413,660 B2 4/2013 Weinstein et al.
8,464,720 B1 6/2013 Pigazzi et al.
8,469,911 B2 6/2013 Hiebert
8,486,070 B2 7/2013 Morgan et al.
8,491,597 B2 7/2013 Russell et al.
8,491,664 B2 7/2013 Mcmahon et al.
8,511,314 B2 8/2013 Pigazzi et al.
8,545,570 B2 10/2013 Crabtree et al.
8,555,439 B2 10/2013 Skripps et al.
8,570,187 B2 10/2013 Janna et al.
8,611,697 B2 12/2013 Nathaniel et al.
8,679,187 B2 3/2014 Allen et al.
8,690,806 B2 4/2014 Hiebert
8,690,807 B2 4/2014 Hiebert
8,702,712 B2 4/2014 Jordan et al.
8,707,484 B2 4/2014 Jackson et al.
8,707,486 B2 4/2014 Chella et al.
8,719,979 B2 5/2014 Jackson
8,721,643 B2 5/2014 Morgan et al.
8,795,312 B2 8/2014 Fan et al.
8,806,679 B2 8/2014 Soto et al.
8,826,474 B2 9/2014 Jackson
8,826,475 B2 9/2014 Jackson
8,828,009 B2 9/2014 Allen et al.
8,833,707 B2 9/2014 Steinberg et al.
8,839,471 B2 9/2014 Jackson
8,844,077 B2 9/2014 Jackson et al.
8,845,568 B2 9/2014 Clark et al.
8,856,986 B2 10/2014 Jackson
8,890,511 B2 11/2014 Belew
8,893,333 B2 11/2014 Soto et al.
8,894,716 B2 11/2014 Mcmahon et al.
8,938,826 B2 1/2015 Jackson
8,944,065 B2 2/2015 Slusarz, Jr.
8,945,026 B2 2/2015 Moser et al.
8,978,180 B2 3/2015 Jackson
8,986,228 B2 3/2015 Auchinleck et al.
8,997,284 B2 4/2015 Kreuzer et al.
8,997,286 B2 4/2015 Wyslucha et al.
8,997,749 B2 4/2015 Drake et al.
9,056,012 B2 6/2015 Crabtree, Jr. et al.
9,072,646 B2 7/2015 Skripps et al.
9,085,915 B1 7/2015 Emmett
9,101,393 B2 8/2015 Jordan et al.
9,107,792 B2 8/2015 Catacchio et al.
9,119,610 B2 9/2015 Matta et al.
9,161,875 B2 10/2015 Clark et al.
9,161,876 B2 10/2015 Pigazzi et al.
9,173,649 B2 11/2015 Clark et al.
9,180,062 B2 11/2015 Jackson
9,186,291 B2 11/2015 Jackson et al.
9,198,817 B2 12/2015 Jackson
9,205,013 B2 12/2015 Jackson
9,211,223 B2 12/2015 Jackson
9,226,865 B2 1/2016 Jackson et al.
9,233,043 B2 1/2016 Labedz et al.
9,265,679 B2 2/2016 Jackson
9,289,342 B2 3/2016 Jackson
9,295,433 B2 3/2016 Jackson et al.
9,295,556 B2 3/2016 Perez, III et al.
9,301,897 B2 4/2016 Jackson
9,308,145 B2 4/2016 Jackson
9,331,262 B2 5/2016 Maejima et al.
RE46,032 E 6/2016 Torrie et al.
9,364,380 B2 6/2016 Jackson
9,456,945 B2 10/2016 Jackson
9,468,576 B2 10/2016 Jackson
9,510,987 B2 12/2016 Jackson et al.
9,549,865 B2 1/2017 Hiebert

(56) References Cited

U.S. PATENT DOCUMENTS 9,610,206 B2 4/2017 Jackson
9,672,662 B2 6/2017 Scanlan et al.
9,750,656 B1 9/2017 Pigazzi et al.
9,782,287 B2 10/2017 Pigazzi et al.
9,931,262 B2 4/2018 Pigazzi et al.
9,936,941 B2 4/2018 Weisel et al.
9,949,883 B1 4/2018 Pigazzi et al.
10,034,806 B1 7/2018 Greenhalgh, Sr.
D832,334 S 10/2018 Kushner et al.
10,130,542 B1 11/2018 Strawder
10,159,520 B2 12/2018 Krickeberg et al.
10,765,580 B1 9/2020 Augustine
10,828,218 B2 11/2020 Shandas et al.
10,912,698 B1 2/2021 Termanini
11,559,455 B2 * 1/2023 Smith .................. A61G 13/123
2002/0023298 A1 2/2002 Lamb et al.
2004/0003468 A1 1/2004 Mitsuishi et al.
2004/0092854 A1 5/2004 D'Amico
2004/0133979 A1 7/2004 Newkirk et al.
2004/0133983 A1 7/2004 Newkirk et al.
2005/0160533 A1 7/2005 Boucher et al.
2006/0047228 A1 3/2006 Petelenz et al.
2006/0074366 A1 4/2006 Ryan et al.
2006/0100562 A1 5/2006 Pamplin
2006/0130713 A1 6/2006 Jones et al.
2006/0185090 A1 8/2006 Jackson
2006/0271056 A1 11/2006 Terrill-grisoni et al.
2007/0161935 A1 7/2007 Torrie et al.
2007/0251011 A1 11/2007 Matta et al.
2007/0277350 A1 12/2007 Hines
2008/0214976 A1 9/2008 Memminger
2008/0216231 A1 9/2008 Lambarth et al.
2008/0309052 A1 12/2008 Neiley et al.
2009/0044339 A1 2/2009 Morin et al.
2011/0023893 A1 2/2011 Striggow et al.
2011/0119829 A1 5/2011 Skripps et al.
2011/0143898 A1 6/2011 Trees
2011/0190676 A1 8/2011 Torrie et al.
2012/0059376 A1 3/2012 Rains et al.
2012/0073476 A1 3/2012 Lai
2012/0204885 A1 8/2012 Koch
2012/0233782 A1 9/2012 Kreuzer et al.
2012/0240938 A1 9/2012 Pamichev
2012/0255122 A1 10/2012 Diel et al.
2012/0259261 A1 10/2012 Clark et al.
2012/0259343 A1 10/2012 Clark et al.
2012/0305005 A1 12/2012 Keith-lucas et al.
2013/0081635 A1 4/2013 Drake et al.
2013/0111666 A1 5/2013 Jackson
2013/0133137 A1 5/2013 Jackson et al.
2013/0174853 A1 7/2013 Pigazzi et al.
2013/0174854 A1 * 7/2013 Pigazzi ................ A61G 13/127
128/845
2013/0191994 A1 * 8/2013 Bellows ............... A61G 13/123
5/624
2013/0199541 A1 8/2013 Sluss et al.
2013/0247301 A1 9/2013 Daley et al.
2013/0269710 A1 10/2013 Moriarty et al.
2013/0312187 A1 11/2013 Jackson
2013/0312188 A1 11/2013 Jackson
2013/0318721 A1 12/2013 Gauta
2013/0338792 A1 12/2013 Schmieding et al.
2013/0345605 A1 12/2013 Steele
2014/0020181 A1 1/2014 Jackson
2014/0033434 A1 2/2014 Jackson
2014/0068863 A1 3/2014 Clark et al.
2014/0068866 A1 3/2014 Catacchio et al.
2014/0082842 A1 3/2014 Jackson
2014/0173827 A1 6/2014 Hiebert
2014/0174451 A1 6/2014 Hiebert
2014/0196212 A1 7/2014 Jackson
2014/0201913 A1 7/2014 Jackson
2014/0201914 A1 7/2014 Jackson
2014/0208512 A1 7/2014 Jackson
2014/0208513 A1 7/2014 Hiebert
2014/0215718 A1 8/2014 Wootton
2014/0215855 A1 8/2014 Frey
2014/0222407 A1 8/2014 Jordan et al.
2014/0283845 A1 9/2014 Slusarz, Jr.
2014/0309646 A1 10/2014 Fan et al.
2014/0317847 A1 10/2014 Jackson
2014/0324056 A1 10/2014 Nikolchev et al.
2014/0352072 A1 12/2014 Holladay
2014/0359941 A1 12/2014 Sharps et al.
2014/0366271 A1 12/2014 Marshall et al.
2015/0008201 A1 1/2015 Qiang et al.
2015/0032041 A1 1/2015 Ingimundarson et al.
2015/0059094 A1 3/2015 Jackson
2015/0067985 A1 3/2015 Gaenzle
2015/0088044 A1 3/2015 Walborn et al.
2015/0122268 A1 5/2015 Slusarz, Jr.
2015/0135441 A1 5/2015 Sommer
2015/0150743 A1 6/2015 Jackson
2015/0164724 A1 6/2015 Drake et al.
2015/0196447 A1 7/2015 Henderson et al.
2015/0202106 A1 7/2015 Hight et al.
2015/0231013 A1 8/2015 Bernardoni et al.
2015/0238273 A1 8/2015 Jordan et al.
2015/0238380 A1 8/2015 Kreuzer et al.
2015/0245915 A1 9/2015 Crabtree, Jr. et al.
2015/0245969 A1 9/2015 Hight et al.
2015/0245971 A1 9/2015 Bernardoni et al.
2015/0272681 A1 10/2015 Skripps et al.
2015/0290064 A1 10/2015 Kreuzer et al.
2015/0297435 A1 10/2015 Visco
2015/0342813 A1 12/2015 Catacchio et al.
2015/0366622 A1 12/2015 Wyslucha et al.
2016/0008201 A1 1/2016 Jackson et al.
2016/0038364 A1 2/2016 Jackson
2016/0051432 A1 2/2016 Clark et al.
2016/0067135 A1 3/2016 Pigazzi et al.
2016/0095784 A1 4/2016 Catacchio et al.
2016/0095785 A1 4/2016 Catacchio et al.
2016/0106612 A1 4/2016 Clark et al.
2016/0120720 A1 5/2016 Hirsch
2016/0120726 A1 5/2016 Moriarty et al.
2016/0184154 A1 6/2016 Lafleche et al.
2016/0228281 A1 8/2016 Marshall et al.
2016/0279007 A1 9/2016 Flatt
2016/0287461 A1 * 10/2016 Naughton .............. A61G 13/08
2016/0317237 A1 11/2016 Geiger
2016/0338691 A1 11/2016 Weber et al.
2017/0239118 A1 8/2017 Cole
2018/0140309 A1 5/2018 Fouts et al.
2018/0140493 A1 5/2018 Shandas et al.
2018/0221190 A1 8/2018 Kaiser et al.
2018/0221229 A1 * 8/2018 Kaiser ................ A61G 13/0081
2018/0221230 A1 8/2018 Smith et al.
2019/0091089 A1 3/2019 Shandas et al.
2020/0129356 A1 4/2020 Shandas et al.
2021/0106480 A1 4/2021 Gomez et al.
2023/0061000 A1 3/2023 Shandas et al.
2023/0157916 A1 5/2023 Smith et al.
2024/0099919 A1 3/2024 Kaiser
2024/0398646 A1 12/2024 Shandas

FOREIGN PATENT DOCUMENTS

DE 202012101347 U1 6/2012
DE 102011016456 B4 10/2012
EP 2574325 A2 4/2013
EP 2623082 A2 8/2013
EP 2618313 B1 7/2014
EP 2873405 A1 5/2015
EP 2982880 A2 2/2016
EP 2802305 B1 10/2017
WO 03/061544 A1 7/2003
WO 2006/091239 A2 8/2006
WO 2007/021806 A2 2/2007
WO 2007/080454 A2 7/2007
WO 2008/150731 A1 12/2008
WO 2009/062324 A1 5/2009
WO 2013/034916 A1 3/2013
WO 2013/106426 A2 7/2013

(56) References Cited

FOREIGN PATENT DOCUMENTS

| | | | |
|---|---|---|---|
| WO | 2014/043538 | A1 | 3/2014 |
| WO | 2014/045194 | A1 | 3/2014 |
| WO | 2014/045199 | A1 | 3/2014 |
| WO | 2014/153329 | A1 | 9/2014 |
| WO | 2014/205218 | A1 | 12/2014 |
| WO | 2016/017479 | A1 | 2/2016 |
| WO | 2016/197142 | A1 | 12/2016 |

OTHER PUBLICATIONS

Kaiser et al., U.S. Advisory Action dated Aug. 2, 2024, directed to U.S. Appl. No. 18/161,851; 3 pages.
Kaiser et al., U.S. Office Action dated Sep. 9, 2024, directed to U.S. Appl. No. 18/161,851; 11 pages.
Smith et al., U.S. Office Action dated Sep. 9, 2024, directed to U.S. Appl. No. 18/158,446; 7 pages.
Smith et al., U.S. Notice of Allowance and Fee(s) Due dated Jan. 16, 2025, directed to U.S. Appl. No. 18/158,446; 7 pages.
"Hip Distraction System: Advanced solutions for supine hip arthroscopy procedures," technical brochure published by Arthrex, 2020; 6 pages.
"Secure and easy patient positioning," technical brochure published by Smith & Nephew, May 2015; 8 pages.
Communication pursuant to Article 94(3) EPC dated Mar. 12, 2020, directed to EP Application No. 16804665.4; 9 pages.
Extended European Search Report dated Jan. 7, 2019, directed to EP Application No. 16804665.4; 8 pages.
Extended Search Report dated Feb. 10, 2021, directed to EP Application No. 18747256.8; 10 pages.
Extended Search Report dated Nov. 3, 2020, directed to EP Application No. 18747404.4; 6 pages.
Harris, The Pink Hip Kit SN: Postless Poitioning System—72205286, Xodus Medical, 2019, https://www.xodusmedical.com/Product/HIP40614SN.
Harris, The Pink Hip Kit SN: Postless Positioning System—HIP40614SN, Xodus Medical, 2019.
Hip Arthroscopy and Fracture Kit, SPK10246—Hip Arthroscopy and Fracture Kit with Perineal Post Cover.
Hip Distraction System: Advanced solutions for supine hip arthroscopy procedures, Arthrex, 2013, pp. 1-6.
Intention to Grant dated Jan. 23, 2024, directed to EP Application No. 16 804 665.4; 8 pages.
Intention to Grant dated Sep. 12, 2023, directed to EP Application No. 16 804 665.4; 8 pages.
International Search Report and Written Opinion dated Apr. 13, 2018, directed to PCT/US2018/017099; 9 pages.
International Search Report and Written Opinion dated Aug. 31, 2016, directed to International Application No. PCT/US2016/036090; 8 pages.
International Search Report and Written Opinion dated May 30, 2018, directed to International Application No. PCT/US2018/017088; 13 pages.
Kaiser et al., U.S. Advisory Action dated Mar. 1, 2022, directed to U.S. Appl. No. 15/890,047; 4 pages.
Kaiser et al., U.S. Notice of Allowance and Fee(s) Due mailed Feb. 15, 2023, directed to U.S. Appl. No. 15/890,047; 11 pages.
Kaiser et al., U.S. Notice of Allowance and Fee(s) Due mailed Sep. 15, 2022, directed to U.S. Appl. No. 17/488,213; 9 pages.
Kaiser et al., U.S. Office Action dated Apr. 19, 2024, directed to U.S. Appl. No. 18/161,851; 12 pages.
Kaiser et al., U.S. Office Action dated Apr. 29, 2022, directed to U.S. Appl. No. 15/890,047; 21 pages.
Kaiser et al., U.S. Office Action dated Jan. 11, 2021, directed to U.S. Appl. No. 15/890,047; 20 pages.
Kaiser et al., U.S. Office Action dated Jun. 25, 2021, directed to U.S. Appl. No. 15/890,047; 19 pages.
Kaiser et al., U.S. Office Action dated Nov. 15, 2021, directed to U.S. Appl. No. 15/890,047; 20 pages.
Kaiser et al., U.S. Office Action dated Nov. 9, 2023, directed to U.S. Appl. No. 18/161,851; 10 pages.
Kaiser et al., U.S. Office Action dated Oct. 28, 2022, directed to U.S. Appl. No. 15/890,047; 24 pages.
Kaiser et al., U.S. Office Action dated Sep. 22, 2020, directed to U.S. Appl. No. 15/890,047; 14 pages.
Kaiser et al., U.S. Appl. No. 62/954,888, filed Dec. 30, 2019, for "Apparatus and Method for Patient Positioning"[A copy is not submitted herewith pursuant to the waiver of 37 C.F.R. § 1.98(a)(2)(iii) issued by the Office on Sep. 21, 2004.].
Kaiser et al., U.S. Restriction Requirement dated Jul. 2, 2020, directed to U.S. Appl. No. 15/890,047; 13 pages.
Klauschie et al. (July/Aug. 2010). "Use of Anti-Skid Material and Patient-Positioning To Prevent Patient Shifting during Robotic-Assisted Gynecologic Procedures," The Journal of Minimally Invasive Gynecology 17(4):504-507.
Kollmorgen, Robert C., The Pink Hip Kit®: Postless Hip Arthroscopy Positioning System, Xodus Medical.
Mei-Dan et al. (Mar. 2018). "Hip Distraction Without a Perineal Post: A Prospective Study of 1000 Hip Arthroscopy Cases," The American Journal of Sports Medicine 46(3):632-641.
Mei-Dan, O. et al. Hip Arthroscopy Distraction Without the Use of Perineal Post: Prospective Study (Abstract), vol. 36, No. 1, Jan. 2013, pp. e1-e5.
Merriam-Webster, "outrigger," https://www.merriam-webster.com/dictionary/outrigger, retrieved on Sep. 9, 2020; 1 page.
Office Action dated Dec. 23, 2021, directed to EP Application No. 16 804 665.4; 5 pages.
Office Action dated Feb. 8, 2023, directed to EP Application No. 18 747 404.4; 5 pages.
Office Action dated Jan. 19, 2024, directed to EP Application No. 18 747 256.8; 6 pages.
Office Action dated Jul. 5, 2022, directed to EP Application No. 18 747 256.8; 4 pages.
Office Action dated May 4, 2023, directed to EP Application No. 18 747 256.8; 9 pages.
Opfell, A., Hip Arthroscopy & Fracture Kit: Maximize patient safety during arthroscopic hip procedures, Xodus Medical, Jul. 12, 2018.
Pink Pad—Advanced Trendelenburg Positioning System, Xodus Medical Inc., 2018, https://www.xodusmedical.com/pinkpad.
Shandas et al., U.S. Advisory Action dated May 19, 2021, directed to U.S. Appl. No. 15/579,409; 3 pages.
Shandas et al., U.S. Notice of Allowance and Fee(s) Due mailed Feb. 10, 2020, directed to U.S. Appl. No. 16/728,876; 10 pages.
Shandas et al., U.S. Notice of Allowance and Fee(s) Due mailed Feb. 16, 2022, directed to U.S. Appl. No. 15/579,409; 10 pages.
Shandas et al., U.S. Notice of Allowance and Fee(s) Due mailed Jul. 1, 2020, directed to U.S. Appl. No. 16/728,876; 8 pages.
Shandas et al., U.S. Notice of Allowance and Fee(s) Due mailed May 2, 2024, directed to U.S. Appl. No. 17/811,862; 7 pages.
Shandas et al., U.S. Office Action dated Dec. 26, 2023, directed to U.S. Appl. No. 17/811,862; 12 pages.
Shandas et al., U.S. Office Action dated Feb. 10, 2021, directed to U.S. Appl. No. 15/579,409; 13 pages.
Shandas et al., U.S. Office Action dated Jul. 8, 2021, directed to U.S. Appl. No. 15/579,409; 11 pages.
Shandas et al., U.S. Office Action dated Sep. 8, 2020, directed to U.S. Appl. No. 15/579,409; 8 pages.
Shandas et al., U.S. Office Action mailed Apr. 26, 2019, directed to U.S. Appl. No. 16/197,913; 17 pages.
Shandas et al., U.S. Office Action mailed Oct. 7, 2019, directed to U.S. Appl. No. 16/197,913; 17 pages.
Shandas et al., U.S. Restriction Requirement dated May 13, 2020, directed to U.S. Appl. No. 15/579,409; 8 pages.
Smith et al, U.S. Notice of Allowance and Fee(s) Due mailed Sep. 21, 2022, directed to U.S. Appl. No. 15/890,124; 8 pages.
Smith et al, U.S. Office Action dated Mar. 22, 2021 directed to U.S. Application No. 15/890,124; 39 pages.
Smith et al., U.S. Advisory Action dated Jun. 28, 2021, directed to U.S. Appl. No. 15/890,124; 4 pages.
Smith et al., U.S. Election Requirement dated Mar. 17, 2020, directed to U.S. Appl. No. 15/890,124; 7 pages.

(56) References Cited

OTHER PUBLICATIONS

Smith et al., U.S. Notice of Allowance and Fee(s) Due mailed Apr. 26, 2022, directed to U.S. Appl. No. 15/890,124; 10 pages.
Smith et al., U.S. Office Action mailed Sep. 16, 2020, directed to U.S. Appl. No. 15/890,124; 29 pages.
Smith et al., U.S. Restriction Requirement dated Jun. 20, 2024, directed to U.S. Appl. No. 18/158,446; 6 pages.
Soule Medical, 2019, https://www.soulemedical.com.
Steep Trendelenburg Positioners, Prime Medical LLC, 2019, http://primemedicalllc.com/steep-trendelenburg- positioners/.
Terry, M.A., Arthroscopic Hip Patient Positioning Using the Advanced Supine Hip Positioning System: Hip Technique Guide, Smith & Nephew, 2013, pp. 1-8.
The Pink Pad XL®: Advanced Trendelenburg Positioning System, Xodus Medical, 2018.
Trendelenburg Positioning Kits, Soule Medical, 2018, https://www.soulemedical.com/index.php/trendelenburg-positioning-kit.
U.S. Surgitech, Inc. (Mar. 2019). "SurgyPad—A Unique & Revolutionary Patient Positioning System" Brochure; 1 page.
Xodus Medical. (Aug. 2019) "Maximizing Trendelenburg Safety—Advanced Trendelenburg Patient Positioning System," located at https://xodusmedical.com/ProductCategory/Trendelenburg; (14 pages).
Young, D.A. et al., Technique allows for hip arthoscopy distraction without perineal post, Orthopedics Today, Jun. 2013, https://www.healio.com/orthopedics/arthroscopy/news/print/orthopedics-today/%7Bac540b4c-9b43-4736-ae8a-606b1457af8b%7D/technique-allows-for-hip-arthroscopy-distraction-without-perineal-post.
Intention to Grant dated Jan. 28, 2025, directed to EP Application No. 18 747 256.8; 9 pages.
Intention to Grant dated Mar. 12, 2025, directed to EP Application No. 18 747 404.4; 8 pages.

* cited by examiner

SYSTEMS AND METHODS FOR SUPPORTING AND STABILIZING A PATIENT DURING HIP DISTRACTION

CROSS-REFERENCE TO RELATED APPLICATIONS

This application is a continuation of U.S. patent application Ser. No. 18/161,851, filed Jan. 30, 2023, which is a continuation of U.S. patent application Ser. No. 17/488,213, filed Sep. 28, 2021, now U.S. Pat. No. 11,564,855, which claims the benefit of U.S. Provisional Application No. 63/084,494, filed Sep. 28, 2020 and U.S. Provisional Application No. 63/148,597, filed Feb. 11, 2021, the entire contents of each of which are hereby incorporated by reference herein.

FIELD

This disclosure relates to hip distraction in general, and more particularly to supporting and stabilizing a patient during hip distraction.

BACKGROUND

When performing surgical procedures on the hip joint, it is common to distract the hip joint prior to the surgery in order to provide additional room within the hip joint during the surgery and in order to better present selected anatomy to the surgeon during the surgery. Hip distraction is commonly achieved by applying a distraction force to the distal end of the leg of the patient. Generally, a surgical boot is placed on the foot and lower leg of the patient, the surgical boot is connected to a distraction frame, and the distraction frame is used to apply a distraction force to the surgical boot, whereby to apply a distraction force to the leg of the patient.

With conventional hip distraction, it is common to provide a padded post (often referred to as a perineal post) between the legs of the patient. This padded post provides a counterforce to the anatomy when the distraction force is applied to the surgical boot. However, the use of a padded post can create complications, since the padded post can press against the pudendal nerve of the patient, and/or the sciatic nerve of the patient, during distraction. Additionally, the padded post can exert pressure on the blood vessels in the leg of the patient during distraction. Thus, it would be desirable to minimize or eliminate the use of the padded post if other means could be used to provide a counterforce to the anatomy when the distraction force is applied to the surgical boot.

With some surgeries, it can be desirable to position the patient in the so-called "Trendelenburg position", e.g., during abdominal surgery. When disposed in the Trendelenburg position, the patient lies on the surgical table "flat on their back", with their feet higher than their head, e.g., by approximately 15-30 degrees. In order to facilitate this arrangement, the surgical table is typically tilted so that the patient's head is angled downward and the patient's feet are angled upward.

In the case of hip arthroscopy, it has been recognized that positioning the patient in this manner can facilitate distraction of the hip joint without a perineal post; that is, the gravitational weight of the patient inclined in the Trendelenburg position counteracts the distraction force in lieu of the perineal post. The frictional forces of the patient on the surgical table also contribute to counteract the distraction force. This approach has sometimes been referred to as "post-less" or "post-free" hip arthroscopy.

There are a number of benefits of post-less hip distraction, including eliminating the risk of damage caused by pressure against the pudendal nerve, the sciatic nerve, and/or the blood vessels of the patient during distraction. Another benefit is that no force is transferred to the non-operative leg, which can eliminate risks associated with forces being applied to the non-operative leg (such as neurovascular damage). Yet another benefit of post-less hip distraction is that a post-less procedure results in less pelvic tilt than conventional distraction using a post.

SUMMARY

According to some embodiments, a method for performing a surgical procedure on a hip of a patient includes positioning the patient on a slide-resisting pad on a surgical table, tilting the surgical table so that the patient is in a Trendelenburg position, applying a distraction force to achieve at least a desired amount of distraction of the hip without a perineal post, and reducing a degree of tilt of the surgical table after the degree of distraction has been achieved. At least a portion of the surgical procedure is then performed on the patient with the surgical table in the reduced degree of tilt. The desired amount of hip distraction is maintained despite the reduced degree of tilt due to a reduction in the required distraction force attributable to relaxation of tissue of the joint and due to the slide-resisting pad providing slide-resisting force sufficient to maintain the position of the patient. Through this method, the surgeon can perform at least a portion of the surgery with the patient in a more natural position similar to that achieved when using a perineal post while benefiting from the advantages of a post-less procedure.

According to various embodiments, a method for hip distraction includes positioning a patient on a slide-resisting pad placed on a surgical table; tilting the surgical table so that the patient is in a first degree of inclination; applying a distraction force to a leg of the patient while the patient is in the first degree of inclination so that a hip joint of the patient is distracted, wherein the distraction force is opposed by a combination of a slide-resisting friction force provided by the slide-resisting pad and a gravitational force attributable to the first degree of inclination; reducing the tilt of the surgical table in accordance with a reduction of the distraction force over time so that the patient is in a second degree of inclination; and performing at least a portion of a surgical procedure on the distracted hip joint while the patient is in the second degree of inclination.

In any of these embodiments, the second degree of inclination may be zero so that the patient is in a horizontal position and the at least a portion of the surgical procedure is performed on the distracted hip joint while the patient is in the horizontal position.

In any of these embodiments, the combination of a slide-resisting friction force provided by the slide-resisting pad and the gravitational force attributable to the first degree of inclination of the patient may be sufficient to oppose the distraction force so that the patient does not slide in a direction of the distraction force.

In any of these embodiments, applying the distraction force may include setting a position of a distractor that applies the distraction force, and wherein the position of the distractor may be maintained while the tilt of the surgical table is reduced.

In any of these embodiments, the inclined first position may be at most 20 degrees from horizontal.

In any of these embodiments, the surgical table may be free of a perineal post.

In any of these embodiments, skin of the patient may be in direct contact with the slide-resisting pad.

In any of these embodiments, the slide-resisting pad may be placed on one or more table top pads of the surgical table.

In any of these embodiments, the slide-resisting pad may extend at least beneath shoulders and buttocks of the patient.

In any of these embodiments, the slide-resisting pad may be strapped to the surgical table.

In any of these embodiments, the slide-resisting pad may be a disposable pad.

In any of these embodiments, the slide-resisting pad may include a foam material.

In any of these embodiments, the slide-resisting pad may include at least one higher friction layer.

In any of these embodiments, the slide-resisting pad may be a single layer of the foam material.

In any of these embodiments, the slide-resisting pad may be less than five inches thick.

In any of these embodiments, the slide-resisting pad may include one or more thickness changes for enhancing patient-to-pad friction.

In any of these embodiments, the one or more thickness changes may include a corrugated shape.

In any of these embodiments, the one or more thickness changes may include a thickened area in a location that corresponds to a location of buttocks of the patient.

In any of these embodiments, the thickened area may form a wedge shape.

In any of these embodiments, the slide-resisting pad may include at least one visual indicator for indicating at least one of how to position the slide-resisting pad on the surgical table and how to position the patient on the slide-resisting pad.

In any of these embodiments, the at least one visual indicator may include at least one cut-out.

In any of these embodiments, the patient may not be strapped to the surgical table.

In any of these embodiments, the distraction force may be applied by moving a boot of a distractor away from the surgical table.

BRIEF DESCRIPTION OF THE FIGURES

The invention will now be described, by way of example only, with reference to the accompanying drawings, in which.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

According to various embodiments, described herein are systems and methods for performing a surgical procedure via post-free hip distraction in which a degree of incline of the patient used to counteract the distraction force is decreased for at least a portion of the surgical procedure while maintaining a desired amount of distraction. According to various embodiments, a patient is placed on a slide-resisting pad on a surgical table and placed in a first degree of inclination (a Trendelenburg position). A distraction force is applied to the patient to achieve a desired amount of distraction of the patient's hip joint) with the distraction force being countered by the frictional force provided by the slide-resisting pad and the gravitational force on the patient acting along the incline. The inventors discovered that the distraction force can decrease over time due to relaxing of the soft tissue of the patient and, therefore, that the degree of incline of the patient can be reduced. Thus, according to various embodiments, the degree of incline of the patient is reduced and at least a portion of the surgical procedure is performed with the patient in the reduced degree of incline, enabling the surgeon to perform the surgical procedure in a more natural position akin to a surgical procedure performed with a perineal post and without the risks to the patient posed by the use of a perineal post.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Figure 1:
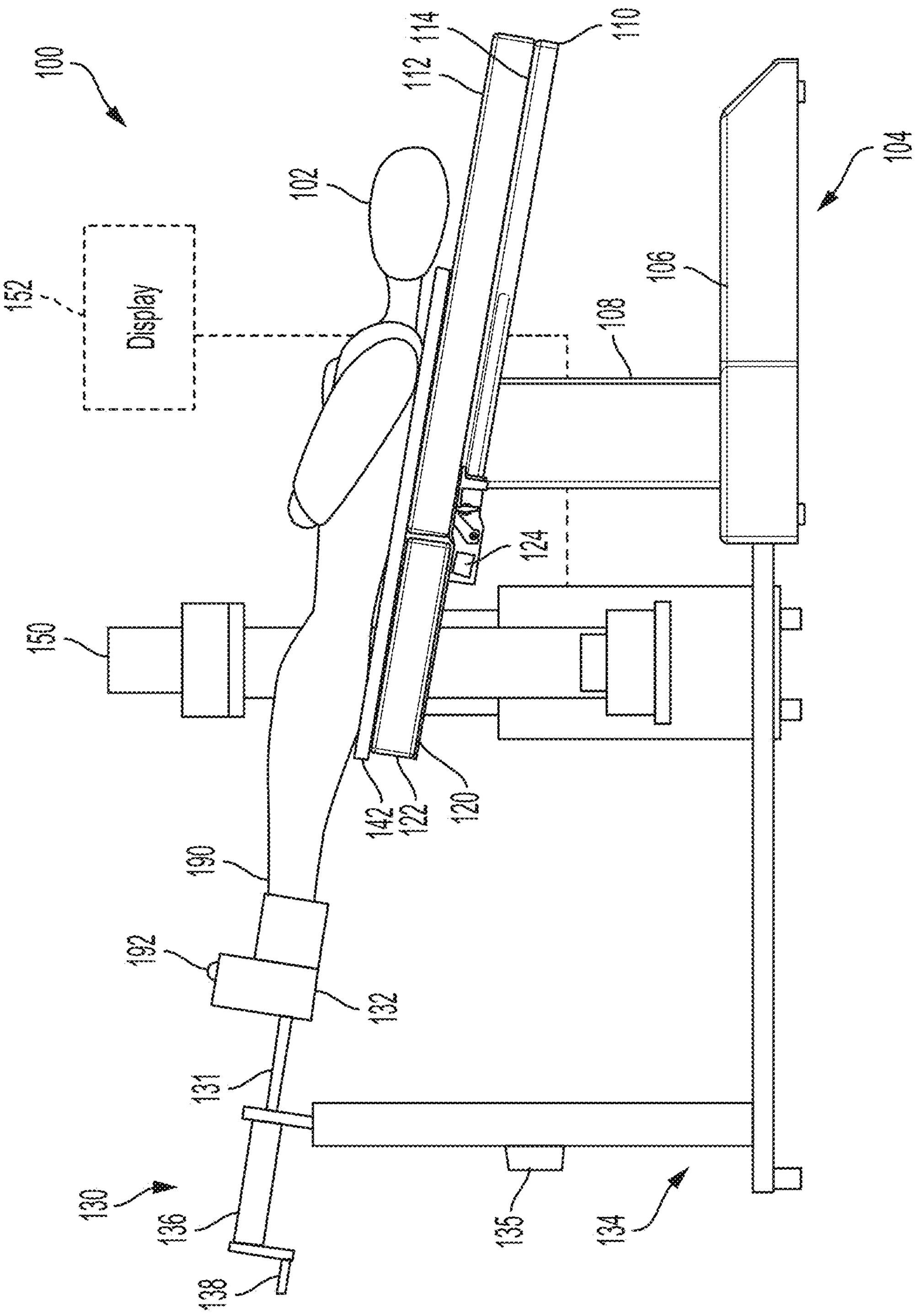
FIG. 1 is a schematic diagram illustrating a system 100 for supporting and stabilizing a patient for hip distraction for performing a surgical procedure on the hip, according to various embodiments.

FIG. 1 is a schematic diagram illustrating a system 100 for supporting and stabilizing a patient for hip distraction for performing a surgical procedure on the hip, according to various embodiments. The patient 102 is supported by a tiltable surgical table 104. Surgical table 104 can be any suitable surgical table that is tiltable for placing the patent in a Trendelenburg position. The surgical table 104 generally comprises a base 106 for contacting the operating room floor, a pedestal 108 rising from base 106, and a platform 110 for supporting the patient. A cushion 112 is generally disposed on the top surface 114 of platform 110.

According to some embodiments, the surgical table 104 comprises a distal portion 120 that may be made of radiolucent materials (e.g., a carbon fiber composite) such that X-ray and/or CT imaging may be performed on the anatomy residing on the distal portion 120, such as via C-arm X-ray system 150. In some embodiments, the distal portion 120 is a removable extension mounted onto an end of the surgical table 104, such as disclosed in U.S. non-provisional patent application Ser. No. 15/890,047, filed on Feb. 6, 2018 and titled "Method and apparatus for supporting and stabilizing a patient during hip distraction," the entire contents of which are hereby incorporated by reference. The distal portion 120 may include a cushion 122.

The surgical table 104 is configured to tilt the platform 110 to position the patient 102 in an inclined position. A degree of inclination can be indicated on an inclinometer 124, which can be located on the platform 110 or on the distal portion 120. The surgical table 104 may be a post-less surgical table—i.e., the surgical table 104 does not have a perineal post.

Figure 4:
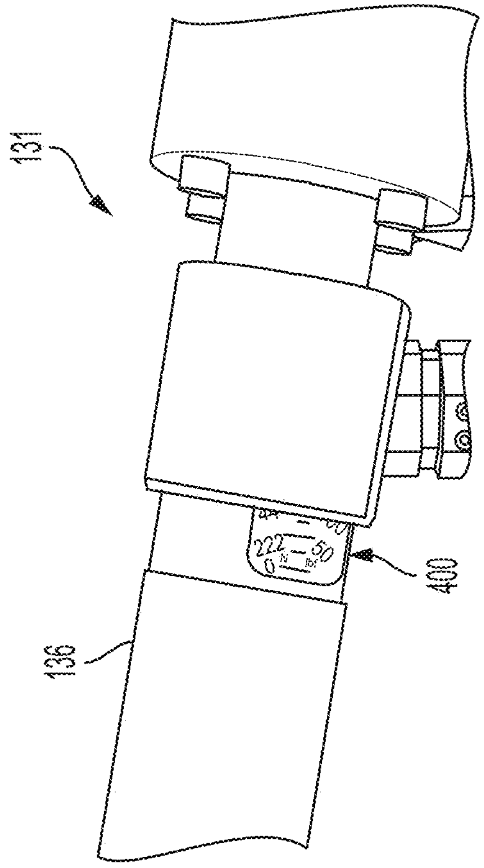
FIG. 4 illustrates a portion of a distraction assembly that includes a force gauge, according to various embodiments.

According to various embodiments, the system 100 include a traction system 130 that includes one or more leg supports 131 for supporting and/or applying traction to the leg 190 of the patient 102. The one or more leg supports 131 can be mounted (e.g., removable mounted) to the surgical table 104, such as to the base 106 of the surgical table 104 or to the platform 110 of the surgical table 104, or can be a free-standing assembly. According to various embodiments, a leg support 131 generally includes a boot 132 for holding the foot 192 of the patient 102 and a support structure (generally indicated by reference numeral 134) for altering a position of the boot 132 and, thereby, the leg 190 of the patient 102. The support structure 134 may be adjustable relative to the surgical table 104, such as via one or more user controls 135, for positioning the leg in the desired position for a surgical procedure and/or for applying a distraction force to the leg. According to various embodiments, the distraction force is applied to the boot 132 through a mechanism 136 to which the boot 132 is mounted. The mechanism 136 may include a user control 138 (e.g., handle, knob, lever, switch, etc.) for making at least some adjustment to an amount of distraction travel of the boot 132 and/or an amount of distraction force applied through the boot 132. The mechanism 136 may include a force gauge, such as force gauge 400 illustrated in FIG. 4, for indicating an amount of traction force applied to the leg 190 through the mechanism 136.

According to various embodiments, a slide-resisting pad 142 is positioned on the top surface of the surgical table 104 (which, according to various embodiments, can include the top portion of the distal portion 120) and is configured to increase the friction between the patient and surgical table 104. The friction provided by the slide-resisting pad, both friction with the surgical table 104 (e.g., between the slide-resisting pad 142 and the cushions 112 and 122) and friction with the patient, can resist at least a portion of the distraction force applied to one or more legs of the patient 102 to reduce the possibility of the patient 102 inadvertently sliding on surgical table 104, particularly during hip distraction and/or leg manipulation and/or during tilting of the patient 102.

Figure 2:
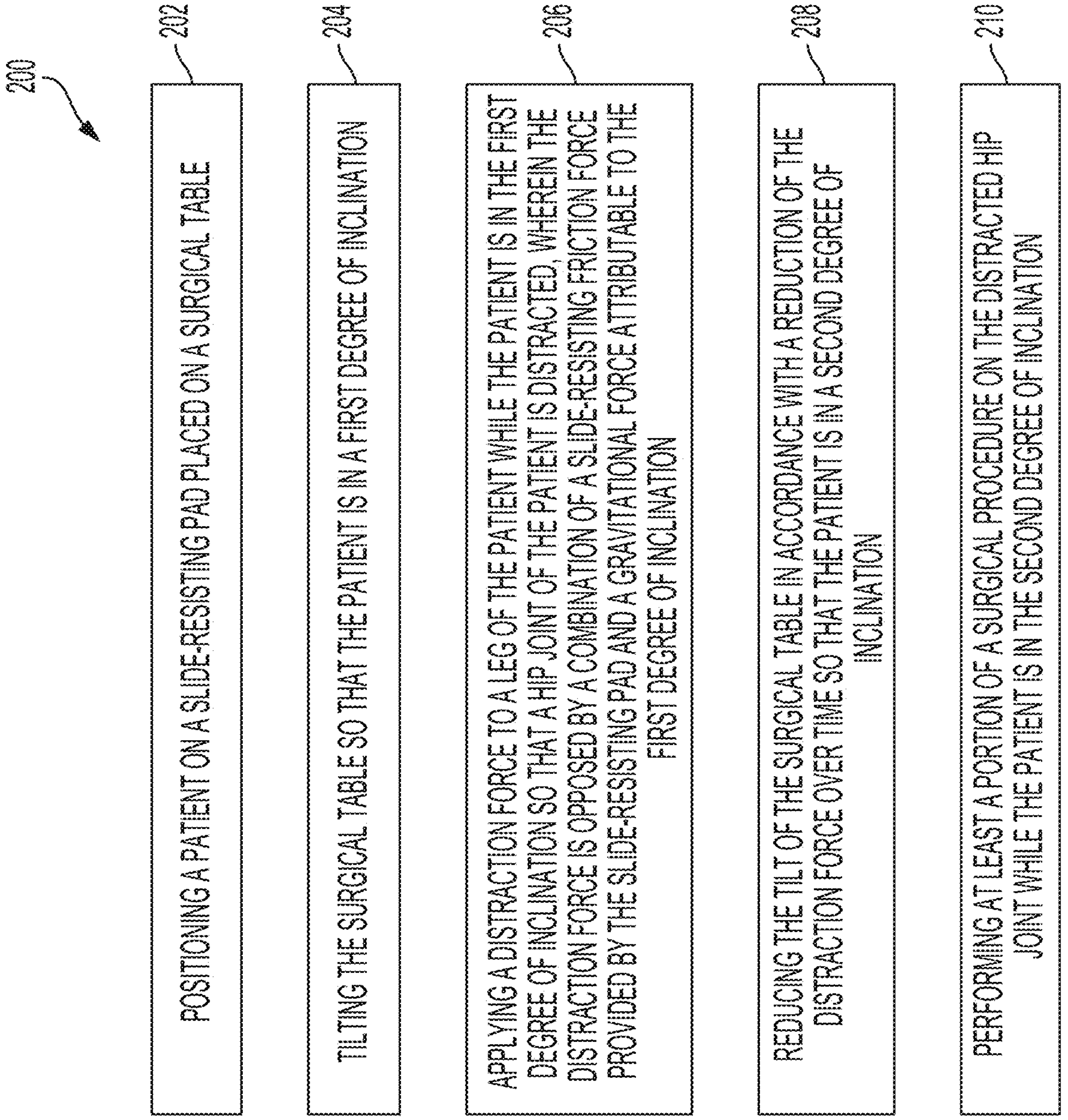
FIG. 2 is a block diagram illustrating a method 200 for performing surgery on a hip of a patient, according to various embodiments.
Figure 3A:
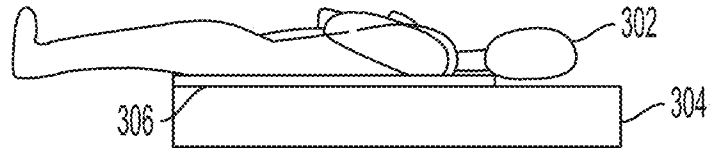
FIG. 3A is a schematic diagram illustrating a patient positioned on a slide-resisting pad on a surgical table that is in a horizontal position, according to various embodiments.

FIG. 2 is a block diagram illustrating a method 200 for performing surgery on a hip of a patient, according to various embodiments. At step 202, a patient is positioned on a slide-resisting pad on a surgical table. For example, the patient may be positioned on slide-resisting pad 142 positioned on surgical table 104 of system 100. According to various embodiments, the slide-resisting pad may be positioned on the surgical table and the patient may be lifted onto the slide-resisting pad or the slide-resisting pad with the patient thereon may be lifted together onto the table. According to various embodiments, the surgical table may be in a horizontal position (i.e., 0 degrees of tilt) when the patient is positioned on the surgical table. FIG. 3A is a schematic diagram illustrating a patient 302 positioned on a slide-resisting pad 306 on a surgical table 304 that is in a horizontal position, according to various embodiments.

According to various embodiments, the patient is positioned with the patient's hips and torso supported by the surgical table. According to various embodiments, the slide-resisting pad may be sized so that the patient's buttocks and shoulders are in contact with the slide-resisting pad. According to various embodiments and referring to system 100 of FIG. 1, the patient's hips may be supported by the distal portion 120 of the surgical table 104, which may be made of radiolucent materials (e.g., a carbon fiber composite) such that X-ray and/or CT imaging may be performed on the hip while the patient is positioned on the surgical table. According to various embodiments, the patient may be strapped to surgical table and/or to the slide-resisting pad. In some embodiments, the slide-resisting pad is strapped to the surgical table. In some embodiments, the patient is not strapped to the surgical table and/or is not strapped to the slide-resisting pad.

According to various embodiments, the patient's skin is in direct contact with the slide-resisting pad to ensure a maximum frictional force between the patient and the slide-resisting pad. In other embodiments, a sheet or patient gown is disposed between the patient and the slide-resisting pad.

According to various embodiments, the patient's leg or legs may be fastened into one or more leg supports that will be used to apply traction to the patient's leg during the surgical procedure, such as one or more leg supports 131 of system 100.

Figure 3B:
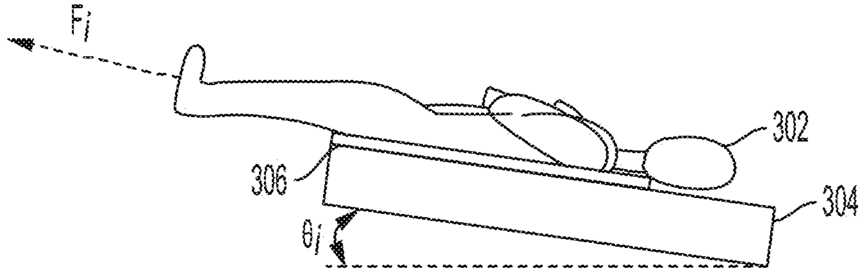
FIG. 3B illustrates the tilting of the patient of FIG. 3A, according to various embodiments

At step 204, the surgical table is tilted so that the patient is in a first degree of inclination, with the patient's head positioned lower than the patient's legs—i.e., positioning the patient in a Trendelenburg position. FIG. 3B illustrates the tilting of the patient, according to various embodiments. The surgical table 304 is titled by an initial angle of $\theta_i$ from horizontal. According to various embodiments, $\theta_i$ is 30 degrees or less, preferably 20 degrees or less, more preferably 15 degrees or less, more preferably 10 degrees or less, or more preferably 5 degrees or less.

Generally, the surgical table is tilted by an amount at least sufficient in combination with the friction force provided by the slide-resisting pad to ensure that a sufficient traction force can be applied to the leg(s) of the patient. In some embodiments, a default amount of tilt is used regardless of the characteristics of the patient and/or the procedure type. In other embodiments, the amount of tilt of the surgical table is tailored to patient characteristics and/or procedure type. For example, the weight of the patient may affect the amount of tilt, with heaver patients generally tilted less than lighter patients. Different procedure types may require different amounts of distraction and, thus, different degrees of tilt. Patients with greater muscle mass may require higher distraction forces, and thus greater degree of tilting, than similar patients with less muscle mass.

At step 206, a distraction force is applied to at least one leg of the patient while the patient is in the first degree of inclination. The applied distraction force is sufficient to distract the hip joint of the patient by a desired amount. Distraction forces can be, for example, up to 150 pounds. The distraction force is illustrated by vector $F_i$ in FIG. 3B. The distraction force can be applied according to well-known techniques and based on the experience of the surgeon and the configuration of the traction system. According to various embodiments, the distraction force is applied by setting a position of a distractor of the traction system of the surgical table. For example, in system 100 of FIG. 1, the distraction force may be applied by moving the boot 132 away from the surgical table 104, such as by moving the support structure 134 via the user control 135 and/or by adjustments to the mechanism 136 via the user control 138. Alternatively, distraction force may be applied by move the surgical table away from the patient's feet. Alternatively, distraction force may be applied by tilting the table in Trendelenburg method.

According to various embodiments, the distraction force $F_i$ and the degree of tilt $\theta_i$ are achieved in an iterative manner, such as by first setting a degree of inclination, applying an amount of distraction force, increasing the degree of tilt should the applied distraction force cause patient sliding, and then increasing the distraction force further. Thus, steps 204 and 208 may be performed at least partially in parallel.

According to various embodiments, an amount of distraction of the hip joint is verified via imaging, such as via display of one or more images generated by C-arm X-ray system 150 on display 152 of system 100. According to various embodiments, the distraction force may be applied in an incremental fashion with the surgeon checking the amount of distraction of the patient's hip after each incremental increase in the distraction force, such as via X-ray imaging.

The distraction force applied to the leg of the patient is generally countered by the frictional force provided by the slide-resisting pad and a component of the patient's weight that acts along the incline. According to various embodiments, additional patient holding force may be provided by one or more straps that strap the patient to the surgical table and/or the slide-resisting pad. According to various embodiments, a fluid (e.g., air, saline) could be injected into the joint to decrease the force required for traction by breaking the suction seal between the labrum and femoral head. This could be done prior to applying a traction force or while a traction force is applied.

The surgical procedure on the hip could be performed by the surgeon with the patient in the Oi inclined position. However, performing the surgical procedure with the patient in a less inclined position may be more desirable for the surgeon, such as because the surgeon may be more experienced performing the surgery with the patient in a horizontal position using a perineal post, the surgical site may be more accessible with less tilt, and/or imaging may be more intuitive with the patient in a horizontal position. The inventors discovered that the amount of distraction force required to maintain a desired amount of distraction can decrease over time, at least in part due to relaxation of the soft tissue of the patient and, thus, that the amount of tilt can be reduced over time in accordance with the reduction in the distraction force.

Figure 3C:
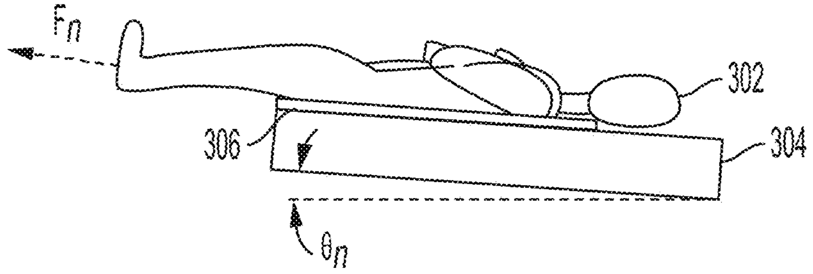
FIG. 3C illustrates a reduced degree of tilt of the patient of FIG. 3A, according to various embodiments.

Accordingly, at step 208 of method 200, the tilt of the surgical table is reduced to a second degree of inclination that is less than the first degree of inclination provided in step 204 in accordance with a reduction of the distraction force over time. A reduced degree of tilt according to various embodiments is illustrated in FIG. 3C in which the degree of tilt, as indicated by $\theta_n$, is less than the degree of tilt in FIG. 3B. At least some distraction force remains and is sufficient to keep the hip joint distracted by the desired amount, which is shown in FIG. 3C by force vector $F_n$. At least a portion of the surgical procedure is then performed at step 210 with the patient positioned in the second degree of inclination and with the hip joint distracted by the desired amount. The second degree of inclination can be any degree of inclination that is less than the first, including 0 degrees of inclination—i.e., horizontal.

According to various embodiments, the tilt of the surgical table can be reduced in step 208 after a predetermined amount of time has elapsed since the hip joint reached the desired amount of distraction. The predetermined amount of time can be, for example, 2, 5, 10, 15, or 20 minutes. The predetermined amount of time may be based on the sex of the patient. In some embodiments, the tilt of the surgical table is reduced in accordance with an observed reduction in the distraction force. For example, the traction system may include a force gauge that indicates an amount of distraction force applied to the patient, such as force gauge 400 of FIG. 4, and the surgeon may reduce the tilt of the surgical table once the force gauge indicates a distraction force that is sufficiently reduced.

According to various embodiments, the position of the distractor that applies the distraction force to the leg of the patient is maintained as the tilt of the surgical table is reduced. In some embodiments, the traction system remains stationary as the surgical table tilt adjustment is made and the position of the traction system is adjusted after the surgical table tilt adjustment is made. In some embodiments, this can include increasing or decreasing the distraction force to the extent the distraction force may have reduced as a result of the change of the tilt of the surgical table.

According to various embodiments, the required amount of distraction and, therefore, the distraction force may change over time during the surgical procedure and the distraction force may be adjusted accordingly. In some embodiments, the degree of tilt of the surgical table may be adjusted in a corresponding manner. For example, a first portion of a surgical procedure may be performed with a first amount of distraction of the hip joint, requiring a first amount of distraction force and a corresponding degree of tilting ($F_n$, $\theta_n$), and a second portion of the surgical procedure may be performed with a second amount of distraction of the hip joint that is less than the first amount of distraction, such that a lower level of distraction force and corresponding degree of tilting ($F_{n+1}<F_n$, $\theta_{n+1}<\theta_n$) is used for the second portion of the surgical procedure. The reverse may be true as well—the distraction force and corresponding tilting may be increased during the surgical procedure.

According to various embodiments, frictional force provided by the slide-resisting pad (due to the patient's weight alone or in combination with one or more straps) may be sufficient to resist the distraction force required for achieved the desired amount of distraction such that the patient need not be placed in the Trendelenburg position. Accordingly, the distraction force may be applied while the surgical table remains horizontal and at least a portion of the surgical procedure may be performed while the hip is distracted and the surgical table is in the horizontal position. Thus, the patient may be initially positioned at 0 degrees of tilt, traction may be applied while the patient is horizontal, the joint may be sufficiently distracted without tilting the patient, and at least a portion of the surgery may be performed while the patient is in the non-tilted position. According to various embodiments, a surgeon may determine whether to place a patient in an inclined position for applying a traction force based on one or more properties of the patient, such as the patient's weight, age, gender, muscularity, etc. In some embodiments, a surgeon may use a Beighton score, which is related to the patient's laxity, to determine how much traction force may be needed, and therefore, whether and how much incline may be needed.

According to various embodiments, the surgical procedure or at least a portion of the surgical procedure comprises a minimally invasive procedure. According to various embodiments, the surgical procedure is or includes hip arthroscopy, hip arthroplasty, femoral neck fracture repair, femoral shaft fracture repair, tibial shaft fracture repair, periacetabular osteotomy, or de-rotational femoral osteotomy. This is merely an exemplary list of surgical procedures and is not intended to be limiting.

According to various embodiments, the slide-resisting pad, such as slide-resisting pad 142 of system 100, is configured to provide high frictional force between the patient and the pad and between the pad and the surgical table (e.g., the cushions of the surgical table) to enable post-free hip distraction with or without positioning the patient in the Trendelenburg position. Examples of suitable slide-resisting pads, according to various embodiments, include any of the stabilizing pads described in U.S. non-provisional patent application Ser. No. 15/890,047, filed on Feb. 6, 2018 and titled "Method and apparatus for supporting and stabilizing a patient during hip distraction." Suitable slide-resisting pads, according to various embodiments, also include any of the pad embodiments described in U.S. provisional patent application No. 62/954,888, filed Dec. 30, 2019, and titled Apparatus and Method for Patient Positioning, the entire contents of which are hereby incorporated by reference.

Figure 5:
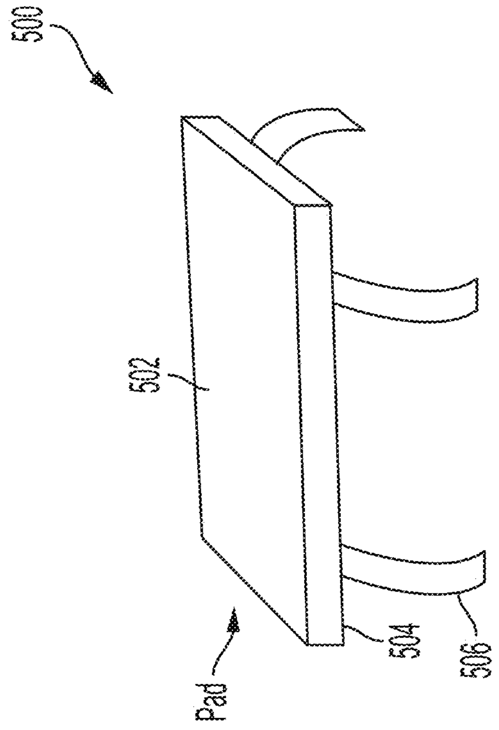
FIG. 5 is a schematic diagram illustrating a slide-resisting pad, according to various embodiments.

FIG. 5 is a schematic diagram illustrating a slide-resisting pad 500 according to various embodiments. Slide-resisting pad 500 includes a top surface 502 for contacting a patient and a bottom surface 504 for contacting the surgical table (e.g., the cushions of the surgical table). The top surface 502 preferably comprises a high friction material for preventing a patient from sliding relative to the pad 500. The top surface 502 is made of a material which is suitable for contacting the skin of a patient, with respect to both patient compatibility and comfort, while also increasing friction with the patient. According to various embodiments, the pad 500 includes straps 506 for strapping the pad 500 to the surgical table and/or to the patient. According to various embodiments, the pad 500 is a disposable pad.

According to various embodiments, the pad 500 is formed of a single material, such as a closed or open cell foam material. The material may have a "tacky" surface to provide high coefficients of friction with the patient and/or table. The foam material may be compliant so as to conform to the patient. A suitable foam material is a polyether polyurethane blend. According to various embodiments, the coefficient of friction of the pad 500 against bare skin is sufficient to enable a traction force to be applied to the patient to achieve a desired amount of traction while the surgical table and patient remain in a horizontal position, which in some embodiments is at least 0.85, at least 0.90, at least 0.95, at least 1.00, at least 1.05, at least 1.10, or at least 1.15, per ASTM D1894. According to various embodiments, these coefficients friction may be achieved with a polyurethane foam pad that provides 12-22 lbs. of force at 25% Indentation Force Deflection per ASTM D3574.

According to various embodiments, the pad 500 is formed of layers of different material. In some embodiments, a high friction material forms the top and/or bottom surfaces 502, 504 and is layered on a central foam material. According to some embodiments, a urethane foam forms a middle layer and an adhesive back suede or leather is disposed on the top and bottom of the middle layer to form the top and bottom surfaces of the pad 500. For example, a Tricot 100% Polyester (0.035" thick) may be laminated on to a foam middle layer, such as a urethane foam middle layer. The suede may be coated with SEBS (styrene-ethylene-butadiene-styrene) hot melt adhesive such that the coated suede has a coefficient of friction between 1.0-3.0 per ASTM D1894.

The pad 500 may be any suitable thickness. In some embodiments, the pad 500 is a minimum of 0.5 inches, which may be a minimum thickness to prevent ripping or tearing during a surgical procedure. In some embodiments, the pad 500 is less than 5 inches thick, preferably a maximum of 3 inches, which provides maximum performance while not being too cumbersome for shipping, storage, and/or handling.

Figure 6A:
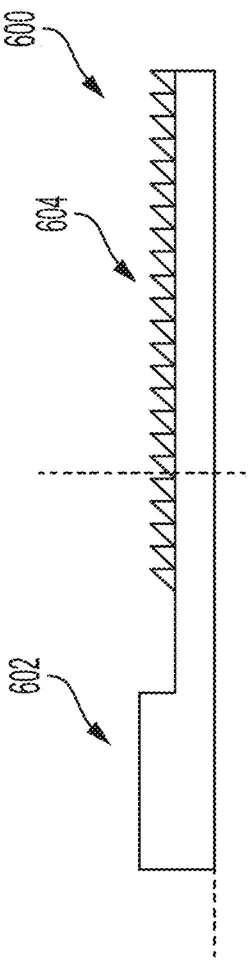
FIGS. 6A-6C illustrate slide-resisting pad configurations, according to various embodiments.
Figure 6B:
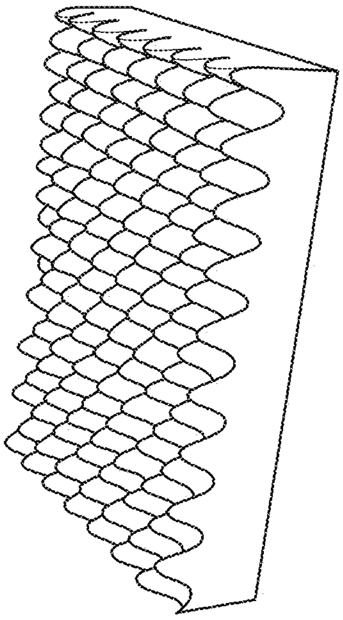
Figure 6C:
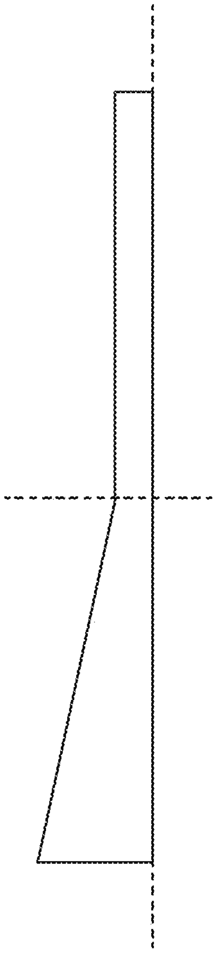

According to various embodiments, the pad 500 includes one or more features cut or formed into a foam material. For example, the pad 500 may have a thickened region intended to be positioned adjacent to a patient's buttocks or shoulders to resist lateral movement of the buttocks or shoulders. An exemplary pad 600 with a thickened region 602 is illustrated in FIG. 6A. In some embodiments, the pad 500 includes a corrugated or serrated shape, such as region 604 of pad 600 in FIG. 6A. A pad can include convolutions, such as shown in FIG. 6B. In some embodiments, the pad includes a wedge-shaped region, such as shown in FIG. 6C, which can be positioned adjacent the buttocks of the patient to provide further resistance to sliding.

Figure 7B:
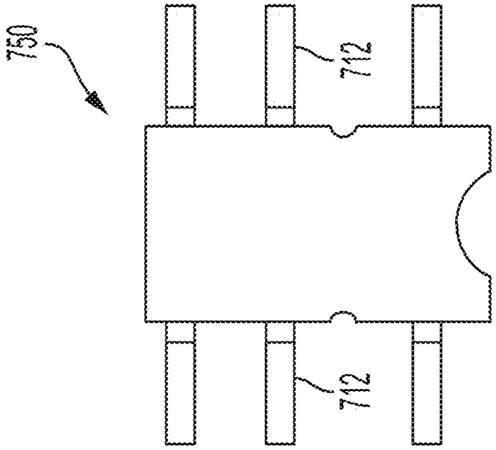
FIGS. 7A and 7B illustrate various slide-resisting pads that can include location indicators and straps, according to various embodiments.
Figure 7A:
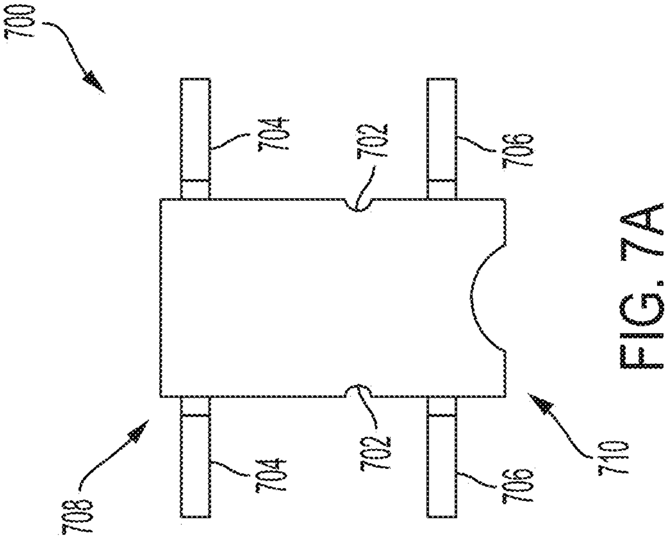
Figure 8:
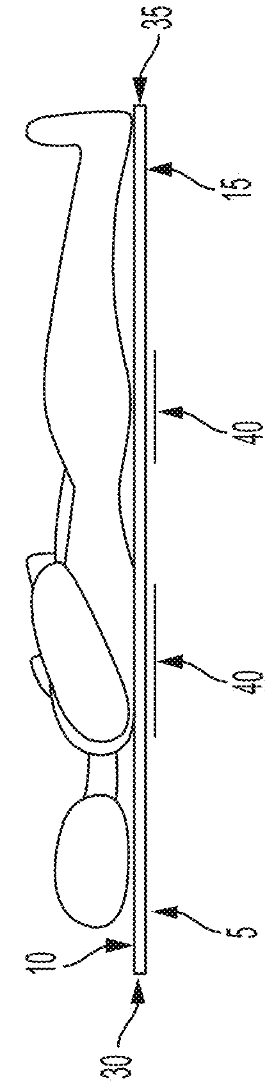
FIGS. 8-10B, 11A-11J and 12-24 are schematic views showing a patient pad comprising at least one first region having a higher coefficient of friction and at least one second region having a lower coefficient of friction, according to various embodiments.
Figure 9:
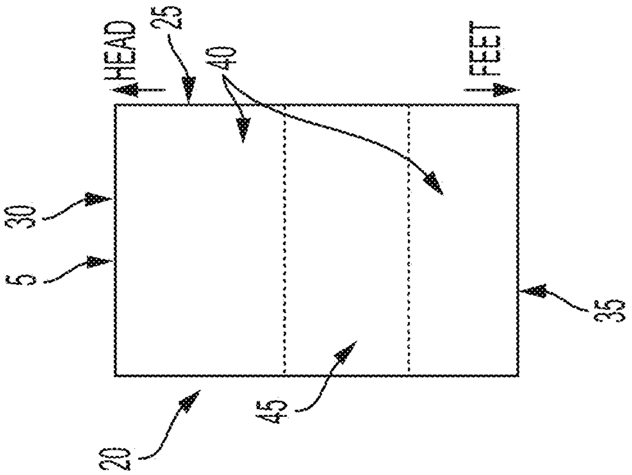
Figure 10A:
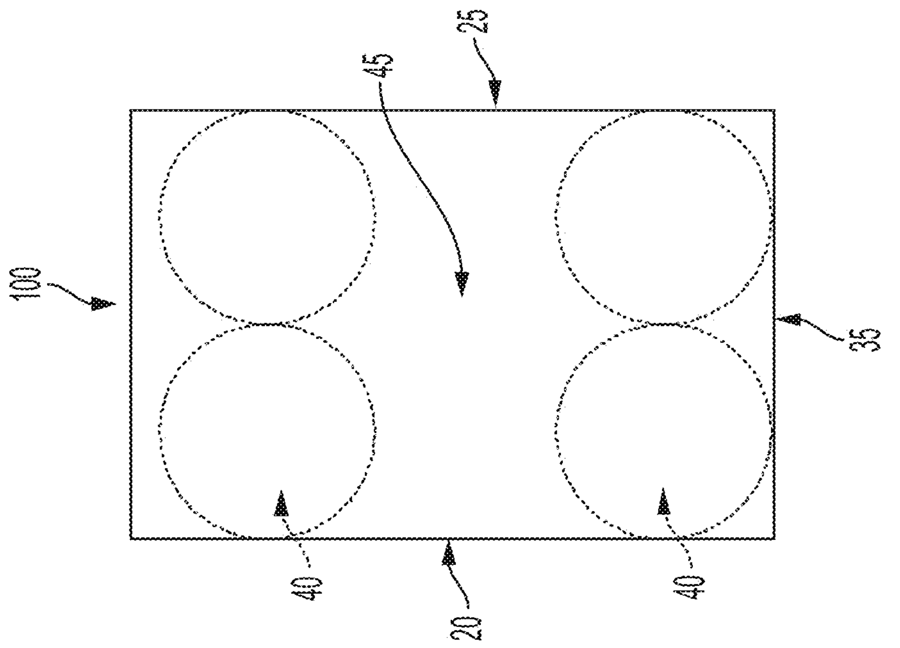
Figure 10B:
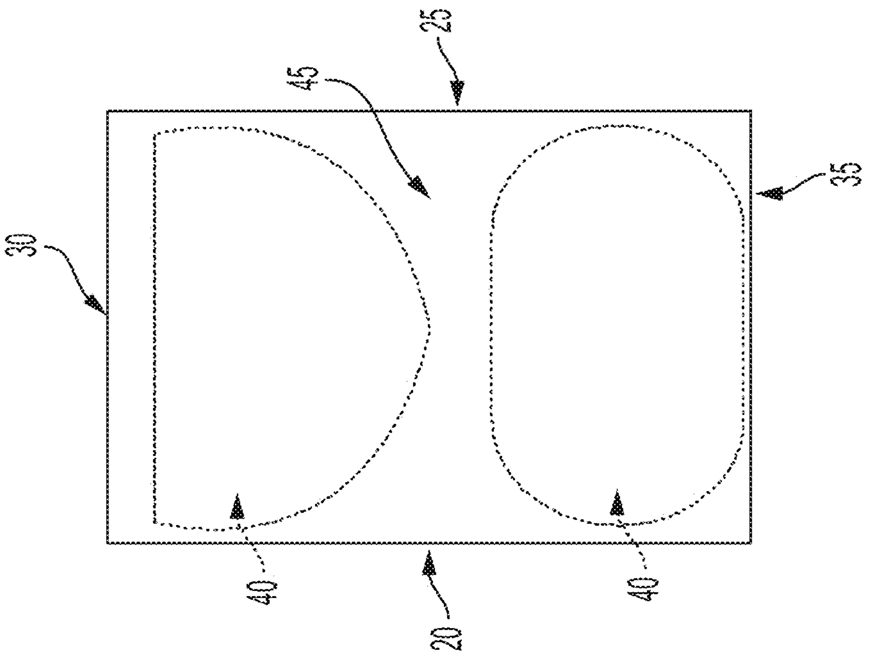

According to various embodiments, the slide-resisting pad includes indicators for indicating proper patient positioning and proper equipment positioning, which may include indicating that there is no metal in the imaging field if anatomy being imaged is arranged in a predetermined manner with respect to the indicators. For example, the pad 700 in FIG. 7 includes two indicators 702 in the form of cutouts, and the pad 700 can be placed on the surgical table such that the cutouts are arranged with respect to a portion of the surgical table that suitable for imaging, such as adjacent the proximal end of the distal portion 120 of system 100. With the pad 700 properly placed on the surgical table, the indicators 702 indicate to the surgical personnel where the patients' hip should be located to enable imaging. The surgical personnel can position patient on pad/table so that patient anatomy that needs to be imaged (x-ray) can be clearly seen without excessive or extra shadowing from the table or mounting brackets. According to various embodiments, the pad 700 includes at least two sets of straps 704 and 706 for strapping the pad 700 to the surgical table and/or to the patient. The first set of straps 704 may be located at a proximal end 708 of the pad 700 at or near the location where the patient's shoulders are positioned. The second set of straps 706 may be located at a distal end 710 of the pad 700 at or near the location where the patient's buttocks are positioned. By locating the straps 704 and 706 at locations of the pad 700 that correspond to the patient's shoulders and buttock, respectively, the locations of the pad 700 that receive the greatest pressure from the patient can be strapped to the surgical table.

In some embodiments, the pad may include more than two sets of straps. For example, in FIG. 7B, pad 750 includes a third set of straps 712 that is located between the first and second sets of straps 704, 706. The third set of straps 712 may be located at the portion of the pad 750 that corresponds to the small of the back of the patient. The typical curvature of a patient's back may result in the patient's body applying the least amount of pressure to the pad at the location that corresponds to the small of the back of the patient. This may lead to bunching of the pad in this location when the patient is inclined. Locating a third set of straps at the small of the back, therefore, can help prevent bunching of the pad and increase the resistance of the pad to movement of the patient.

In some embodiments, straps 704 attach to the surgical table (e.g. the side rails). In some embodiments, straps 706 attach to the distal portion 120; in this embodiment, straps 706 may attach to cutouts in the distal portion. In some embodiments, straps 712 may attach to the distal portion 120, the platform 110 or the connection between the distal portion 120 and the platform 110.

FIGS. 8-10B, 11A-11J and 12 illustrate various embodiments of a slide-resisting pad configured in particular for facilitating transferring a patient from a gurney to a surgical table, transporting the patient along the surgical table, stabilizing the patient on the surgical table during a surgical procedure, and/or transporting the patient off the surgical table and back onto a gurney at the conclusion of the surgical procedure. Patient pad 5 comprising a top surface 10 for supporting a patient, and a bottom surface 15 for engaging a support structure. Patient pad 5 further comprises (when seen from the perspective of an observer) a right side edge 20, a left side edge 25, a top edge 30 and a bottom edge 35. Bottom surface 15 comprises at least one first region 40 having a higher coefficient of friction, and at least one second region 45 having a lower coefficient of friction. During transport of the patient from a gurney to the surgical table, transport of the patient along the surgical table, and transport of the patient from the surgical table back onto a gurney, second region 45 (having a lower coefficient of friction) engages the support structure (e.g., the gurney or the surgical table) and first region 40 (having a higher coefficient of friction) does not engage the support structure, whereby to facilitate transport of the patient by sliding patient pad 5 (carrying the patient) along the support structure; and during stabilizing of the patient on the surgical table during a surgical procedure, first region 40 (having a higher coefficient of friction) engages the support structure and second region 45 (having a lower coefficient of friction) may or may not engage the support structure (either fully or partially or not at all), whereby to facilitate stabilizing the patient on the surgical table by preventing sliding of patient pad 5 (carrying the patient) along the surgical table.

By way of example but not limitation, when the patient needs to be transported from a gurney to the surgical table, transported along the surgical table, and transported from the surgical table back onto a gurney, patient pad 5 is gripped alongside two or more of its edges and lifted so that second region 45 (having a lower coefficient of friction) engages the support structure (e.g., the gurney or the surgical table) and first region 40 (having a higher coefficient of friction) does not engage the support structure. Patient pad 5 (carrying the patient) is then slid along the support structure so as to facilitate transport of the patient. When the patient needs to be stabilized on the surgical table during a surgical procedure, patient pad 5 is not lifted along two or more of its edges so that first region 40 (having a higher coefficient of friction) engages the support structure and second region 45 (having a lower coefficient of friction) may or may not engage the support structure (either fully or partially or not at all), whereby to stabilize the patient on the surgical table by preventing sliding of patient pad 5 (carrying the patient) along the surgical table.

In some embodiments, the body of patient pad 5 comprises one or more sheets of material (e.g., a foam sheet, a plastic sheet, a textile sheet, etc., including any of the materials described above) which is strong enough to support the weight of the patient; top surface 10 of patient pad 5 comprises an atraumatic material which provides resistance to a patient sliding thereon (e.g., high friction foam); first region 40 (having a higher coefficient of friction) comprises a layer of material (e.g., foam, suction cups, etc.) disposed on bottom surface 15 of patient pad 5; and second region 45 (having a lower coefficient of friction) comprises a layer of material (e.g., low friction foam, a polymer sheet, a woven sheet, rollers, etc.) disposed on bottom surface 15 of patient pad 5.

Figure 11A:
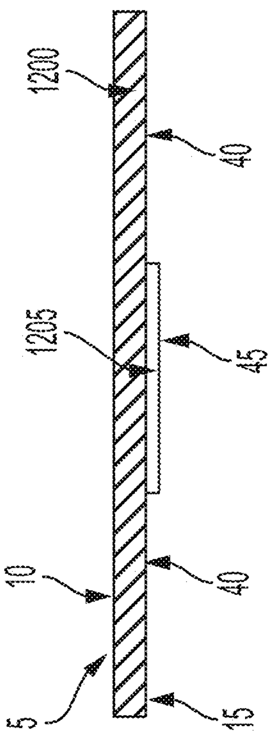
Figure 11B:
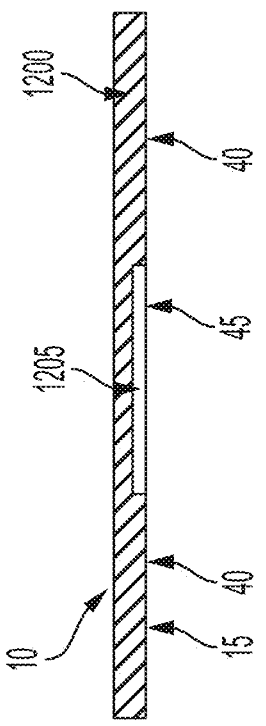
Figure 11C:
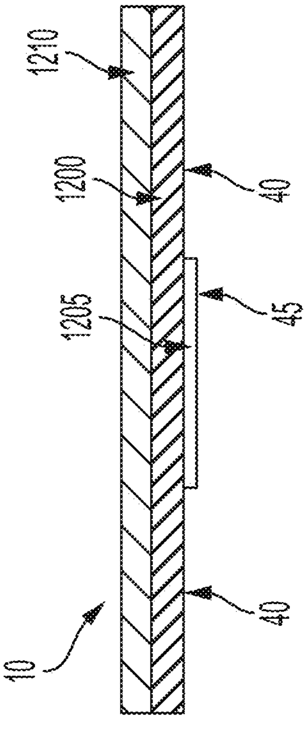
Figure 11D:
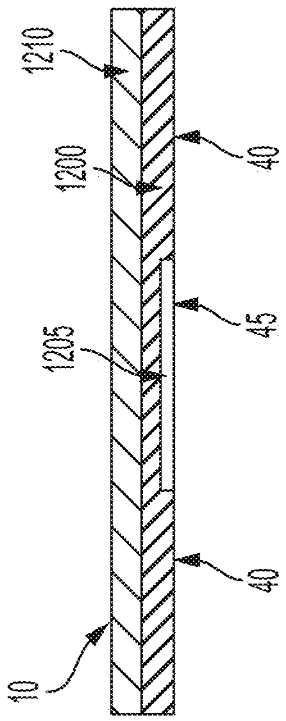

By way of example but not limitation, and looking now at FIG. 11A, patient pad 5 may comprise a sheet 1200 formed out of a material having a higher coefficient of friction, such that one or more portions of the bottom surface 15 of sheet 1200 constitute one or more first regions 40 (having a higher coefficient of friction). One or more sheets 1205 formed out of a material having a lower coefficient of friction may be mounted to the bottom of sheet 1200, such that one or more second regions 45 (having a lower coefficient of friction) are provided on the bottom of patient pad 5. FIG. 11B shows a construction similar to that of FIG. 11A, except that the one or more sheets 1205 are received in one or more recesses formed in sheet 1200. FIGS. 11C and 11D show constructions which are similar to FIGS. 11A and 11B, respectively, except that a sheet 1210 is mounted above sheet 1200. In some embodiments, sheet 1210 may be optimized to provide atraumatic contact with the patient while providing resistance to patient sliding thereon.

Figure 11E:
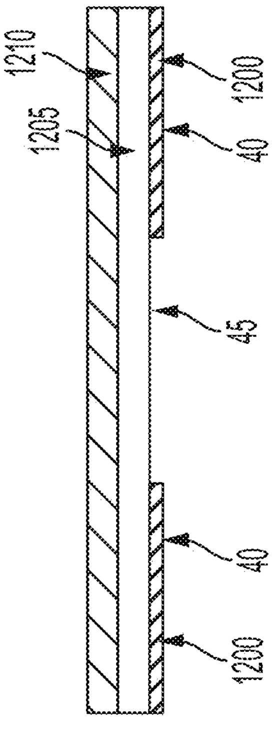
Figure 11F:
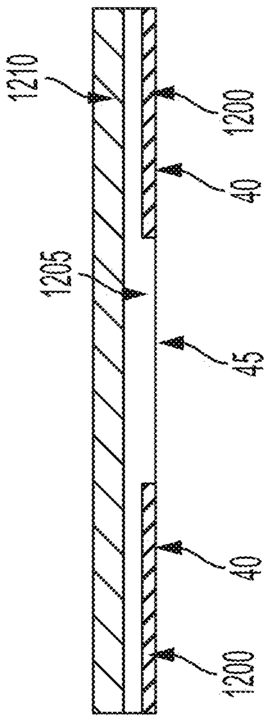
Figure 11H:
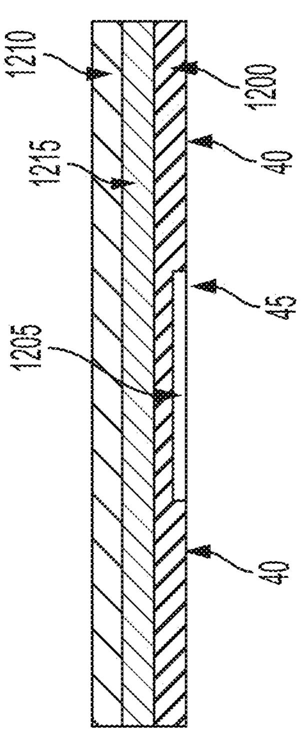
Figure 11G:
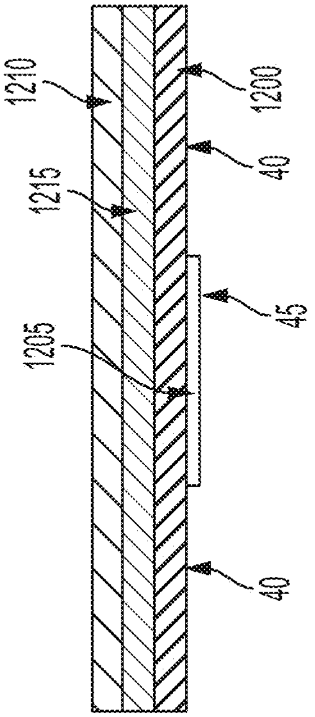

FIG. 11E shows another construction in which a sheet 1205, formed out of a material having a lower coefficient of friction, has one or more sheets 1200, formed out of a material having a higher coefficient of friction, mounted below sheet 1205, and in which a sheet 1210 is mounted above sheet 1205. FIG. 11F shows a construction similar to that of FIG. 11E, except that the one or more sheets 1200 are received in one or more recesses formed in sheet 1205. FIGS. 11G and 11H are similar to FIGS. 11C and 11D, respectively, except that one or more intermediate sheets

Figure 11J:
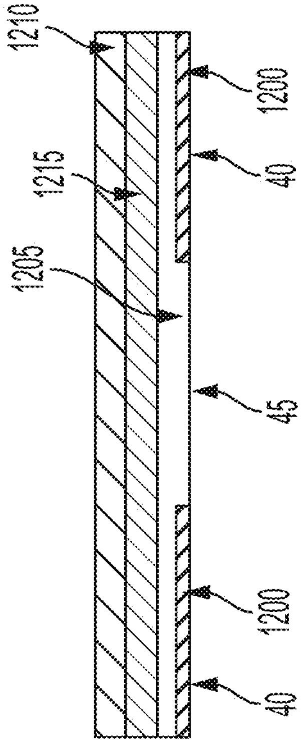
Figure 11I:
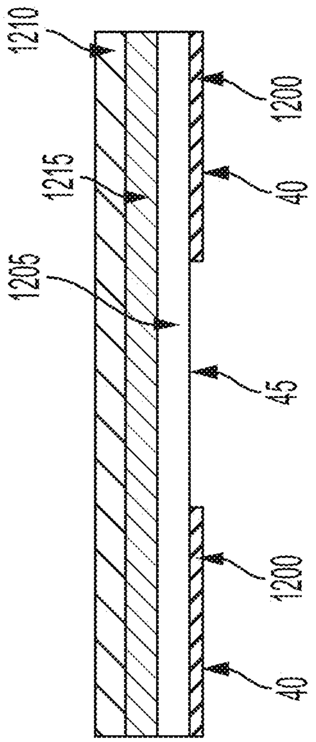
Figure 12:
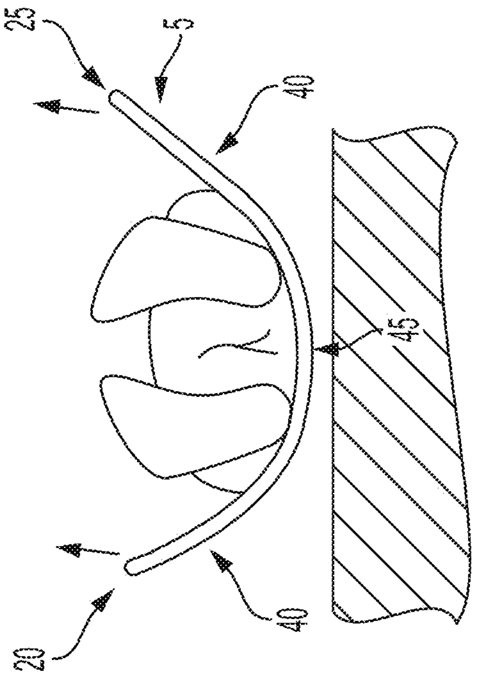
Figure 13:
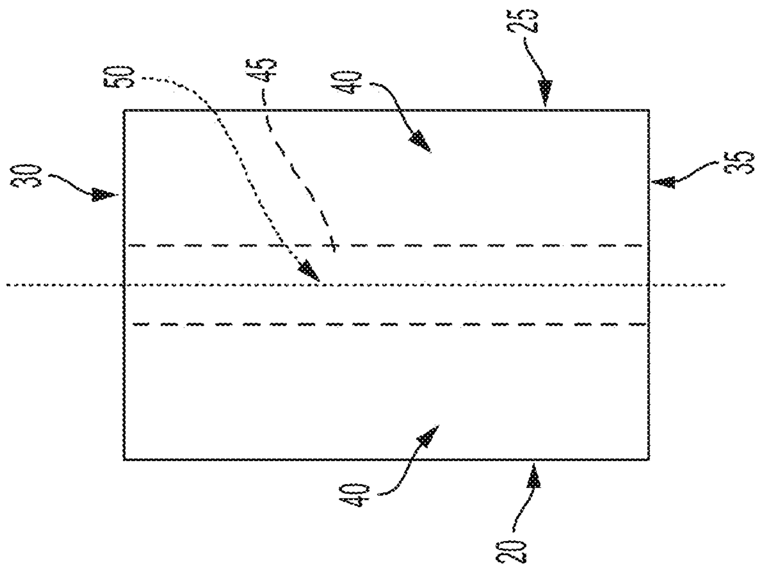
Figure 14:
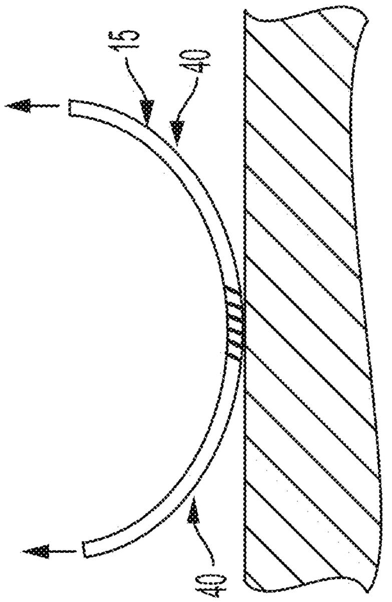
Figure 15:
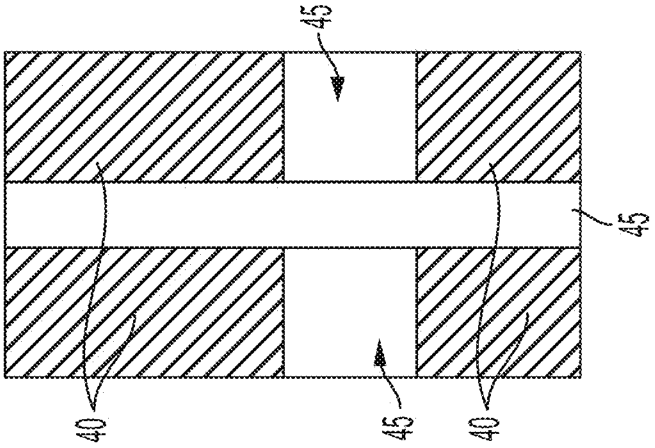
Figure 16:
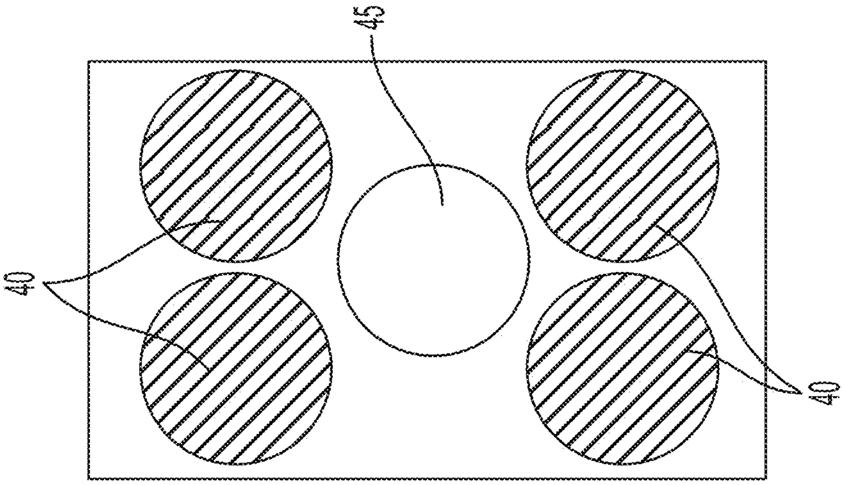
Figure 17:
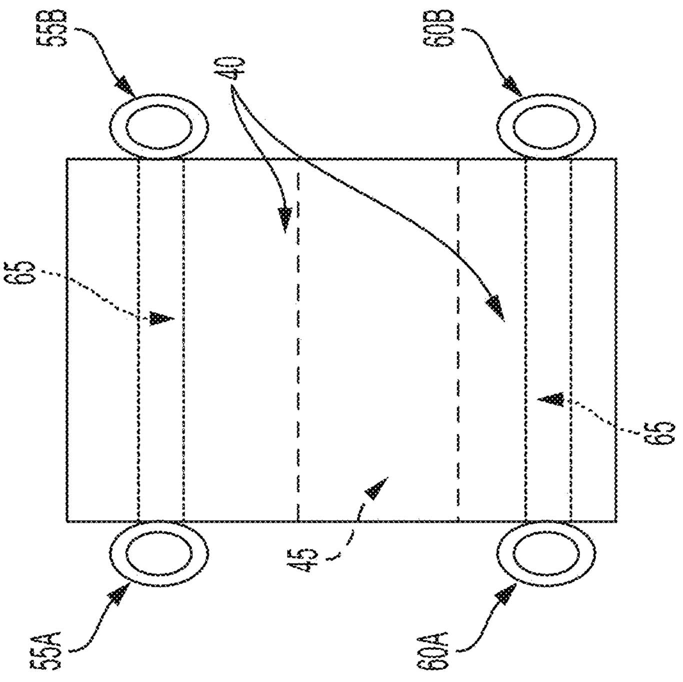
Figure 18:
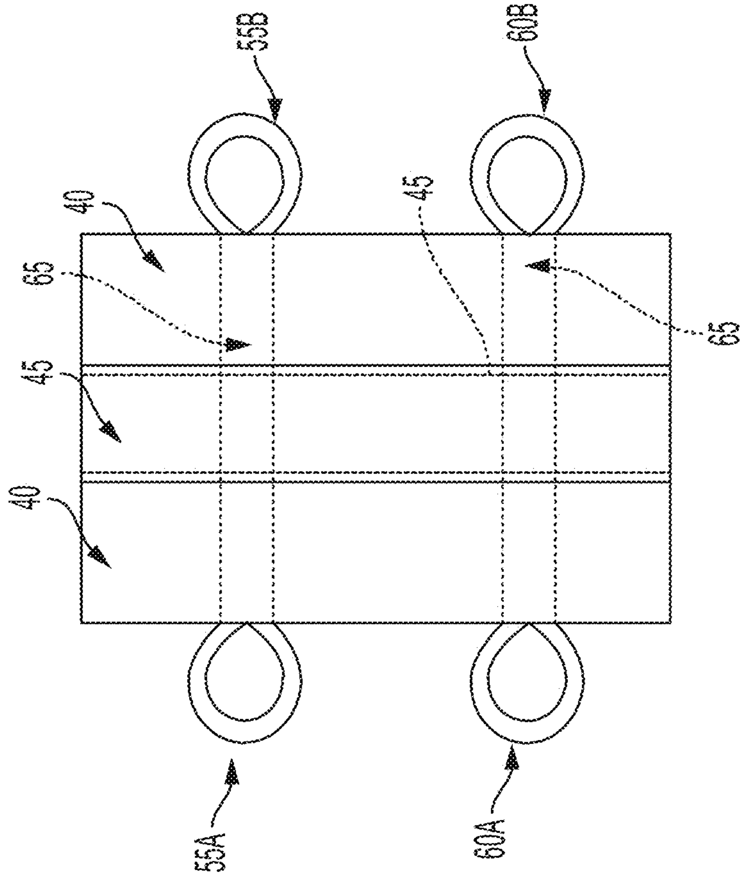
Figure 19:
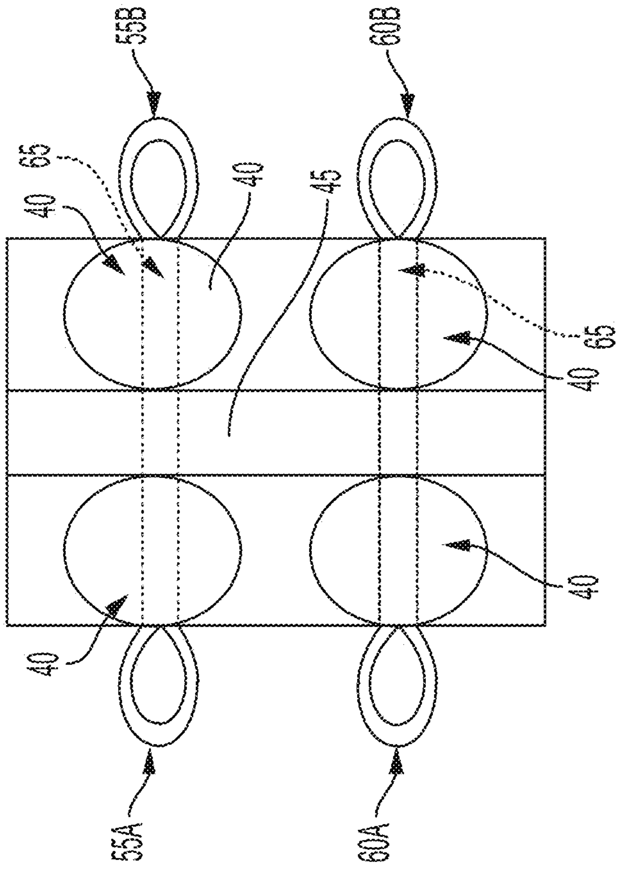
Figure 20:
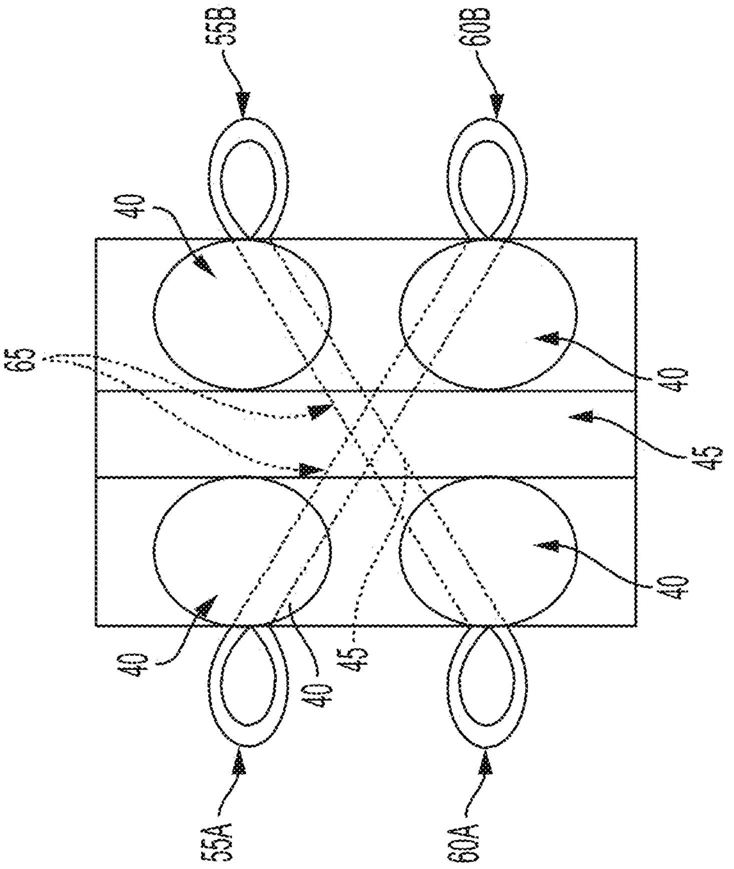
Figure 21:
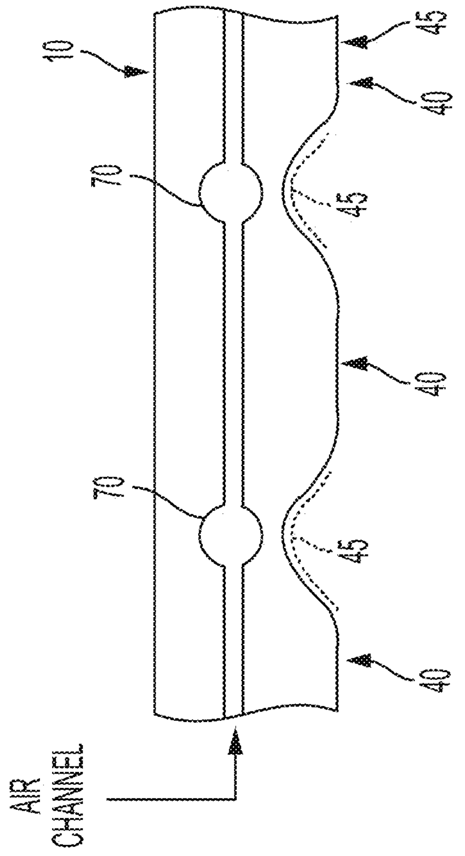
Figure 22:
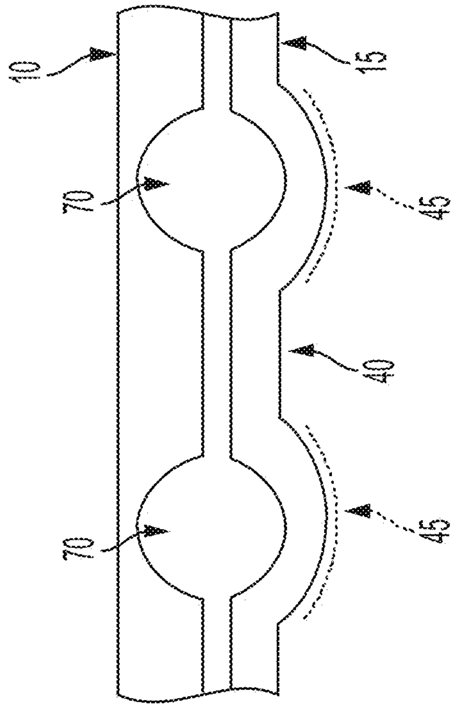
Figure 23:
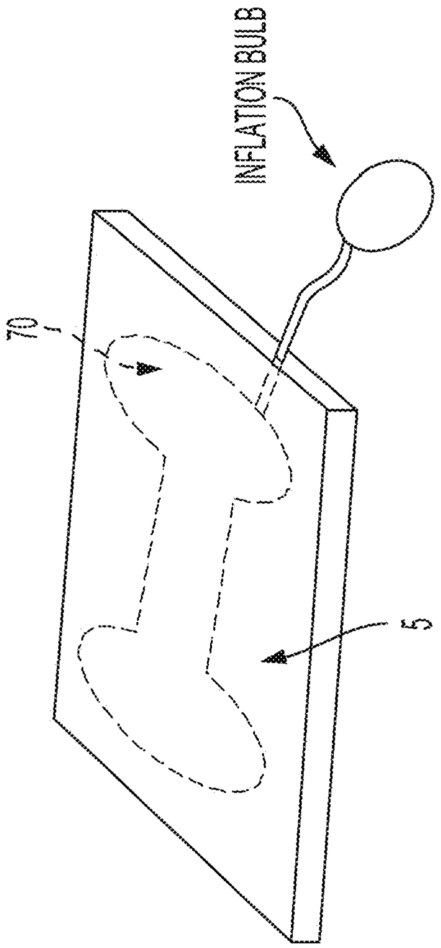
Figure 24:
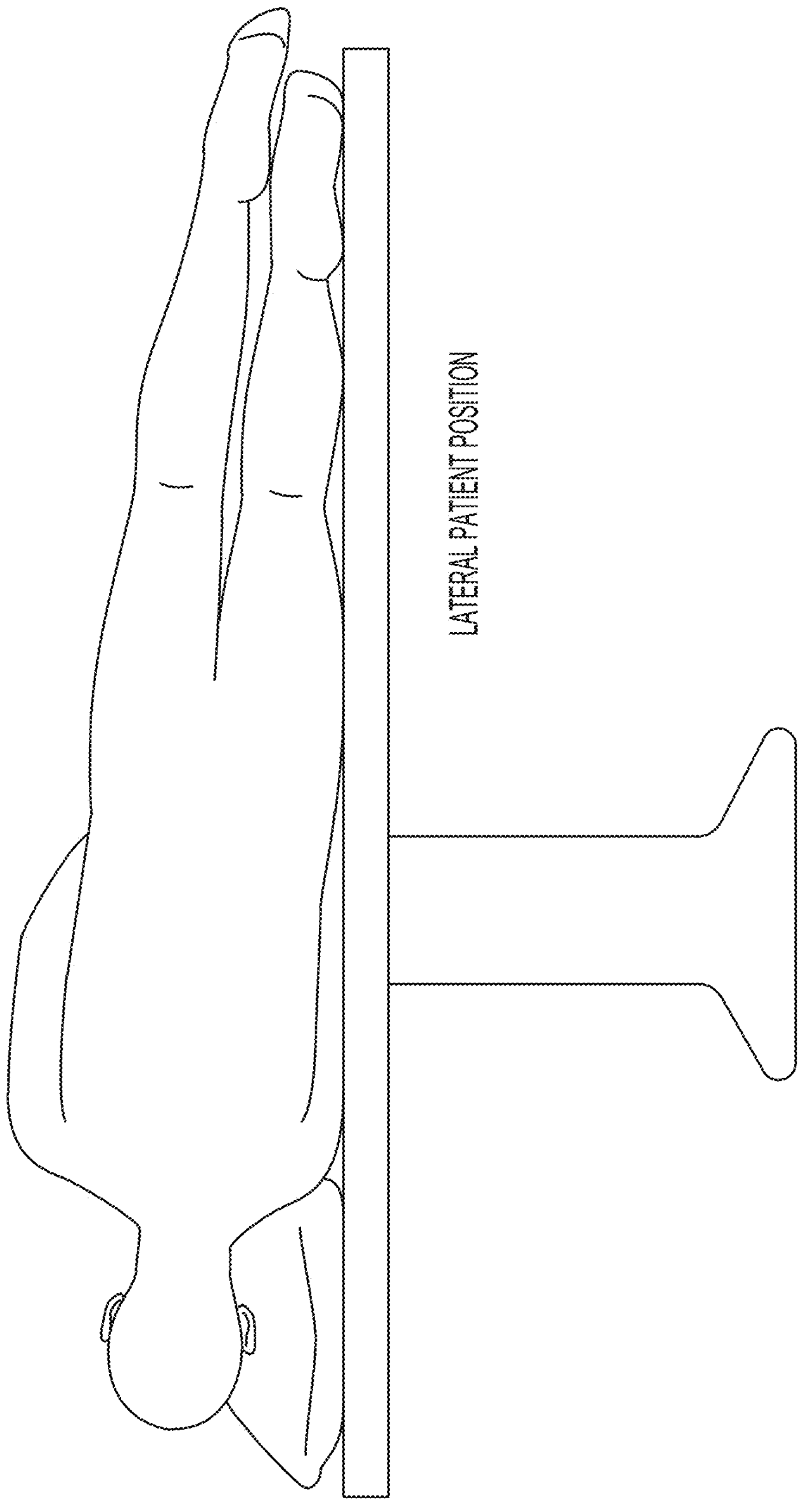

1215 are interposed between sheets 1200 and 1210. Sheet 1215 may be optimized for various functionality, e.g., strength. FIGS. 11I and 11J are similar to FIGS. 11E and 11F, respectively, except that one or more intermediate sheets 1215 are interposed between sheets 1205 and 1210.

According to various embodiments, a first region 40 is disposed beneath at least one of a hip/buttocks and a shoulder of the patient, inasmuch as the hips/buttocks and shoulders of the patient tend to be weight concentrators, as described above with respect to FIGS. 7A and 7B. According to various embodiments, a first region 40 is disposed beneath a hip/buttocks of the patient and another first region 40 is disposed beneath a shoulder of the patient. According to various embodiments, a second region 45 is disposed between two adjacent first regions 40. According to various embodiments, a first region 40 is disposed beneath each hip/buttocks and shoulder of the patient. According to various embodiments, a different first region 40 is disposed beneath each hip/buttock and shoulder of the patient. In some embodiments, if desired, a second region 45 may be disposed between two adjacent first regions 40. According to various embodiments, a first region 40 is disposed beneath the two hips/buttocks of the patient and another first region 40 is disposed beneath the two shoulders of the patient. In some embodiments, if desired, a second region 45 may be disposed between two adjacent first regions 40.

According to various embodiments, and looking now at FIGS. 12-15 and 18-22, patient pad 5 comprises a central longitudinal axis 50, and a second region 45 is disposed along central longitudinal axis 50, a first region 40 is disposed on one side of the second region and another first region 40 is disposed on the other side of the second region. In some embodiments, if desired, one first region 40 may be disposed beneath one hip of the patient and another first region 40 may be disposed beneath the other hip of the patient, and the second region 45 may be disposed between the two first regions 40. In some embodiments, if desired, one first region 40 may be disposed beneath one shoulder of the patient and another first region 40 may be disposed beneath the other shoulder of the patient, and the second region 45 may be disposed between the two first regions 40. In some embodiments, if desired, one first region 40 may be disposed beneath one hip of the patient, another first region 40 may be disposed beneath the other hip of the patient, a first region 40 may be disposed beneath one shoulder of the patient, another first region 40 may be disposed beneath the other shoulder of the patient, and adjacent first regions 40 may be separated from one another by second regions 45. According to various embodiments, patient pad 5 may be configured to change its points of contact with the support structure by changing the configuration of its bottom surface 15. According to various embodiments, patient pad 5 is configured to change the configuration of bottom surface 15 by lifting of patient pad 5.

According to various embodiments, patient pad 5 may comprise central longitudinal axis 50, right side edge 20 on one side of central longitudinal axis 50, left side edge 25 on the other side of central longitudinal axis 50, a right side handle 55 adjacent right side edge 20 and a left side handle 60 adjacent left hand edge 25, such that upon lifting the two handles, the right and left side edges sit further from the support structure than central longitudinal axis 50. As a result, second region 45 (having a lower coefficient of friction) engages the support structure and first regions 40 (having a higher coefficient of friction) are disengaged from the support structure, thereby enabling patient pad 5 (carrying the patient) to be slid along the support structure. According to various embodiments, second region 45 is aligned with central longitudinal axis 50 and first region 40 is laterally offset from central longitudinal axis 50.

According to various embodiments, and looking now at FIGS. 17-20, a strap 65 extends between the two handles 55, 60. According to various embodiments, a right side shoulder handle 55A is disposed adjacent right side edge 20 in the vicinity of a shoulder of the patient, a right side hip handle 55B is disposed adjacent right side edge 20 in the vicinity of a hip of the patient, a left side shoulder handle 60A is disposed adjacent left side edge 25 in the vicinity of a shoulder of the patient, and a left side hip handle 60B is disposed adjacent left side edge 25 in the vicinity of a hip of the patient. According to various embodiments, a strap 65 extends between right side shoulder handle 55A and left side shoulder handle 60A, and another strap 65 extends between right side hip handle 55B and left side hip handle 60B. According to various embodiments, a strap 65 extends between right side shoulder handle 55A and left side hip handle 60B, and another strap 65 extends between left side shoulder handle 60A and right side hip handle 55B.

According to various embodiments, and looking now at FIGS. 21-24, patient pad 5 comprises a contoured bottom surface 15 wherein second region 45 (having a lower coefficient of friction) normally resides further away from the support structure (e.g., the gurney or the surgical table) than first region 40 (having a higher coefficient of friction). Patient pad 5 also comprises an inflatable chamber 70 for selectively moving first region 40 further away from the support structure than second region 45. As a result, when inflatable chamber 70 is inflated, second region 45 (having a lower coefficient of friction) engages the support structure and first region 40 (having a higher coefficient of friction) is disengaged from the support structure, thereby enabling patient pad 5 (carrying the patient) to be slid along the support structure. When inflatable chamber 70 is deflated, second region 45 (having a lower coefficient of friction) may or may not engage the support structure (either fully or partially or not at all) and first region 40 (having a higher coefficient of friction) engages the support structure, whereby to stabilize the patient on the surgical table by preventing sliding of patient pad 5 (carrying the patient) along the surgical table. In some embodiments, inflatable chamber 70 is aligned with second region 45.

Figure 25:
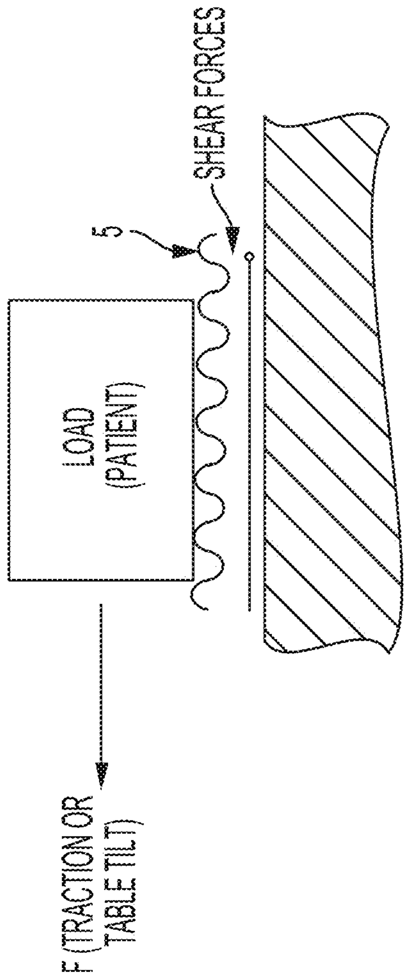
FIGS. 25-27 are schematic views showing a patient pad comprising a stiffener to resist bunching when the patient pad is subject to a sliding force, according to various embodiments.
Figure 26:
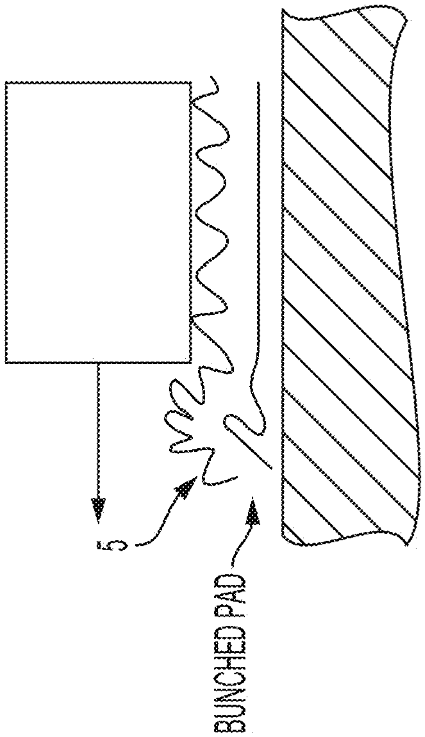
Figure 27:
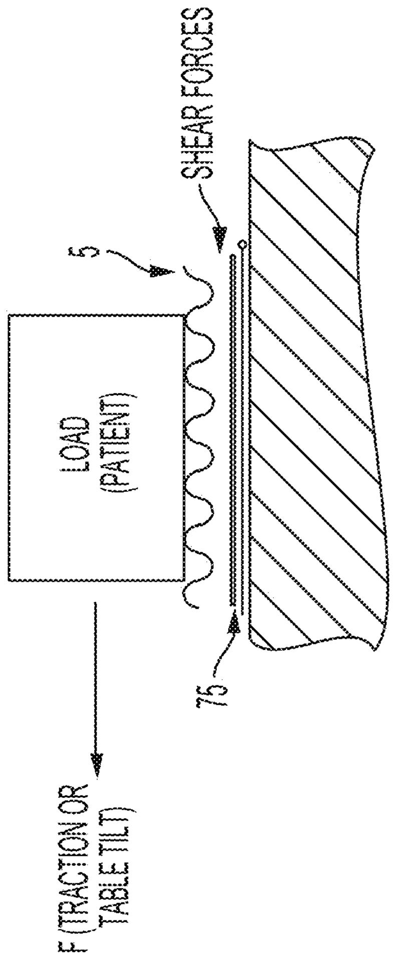

According to various embodiments, and looking now at FIGS. 25-27, patient pad 5 further comprises a stiffener 75 to resist bunching when patient pad 5 is subjected to a sliding force. In some embodiments, stiffener 75 preferably comprises a layer of material disposed between top surface 10 and bottom surface 15 of patient pad 5, although the layer of material could also be disposed alongside top surface 10 and/or bottom surface 15. In one preferred form of the invention, stiffener 75 comprises one or more semi-rigid materials, e.g., plastic sheets. Alternatively, where the patient pad is a composite comprising multiple layers, the desired stiffened effect may be achievable with selective stacking of the layers.

Figure 28:
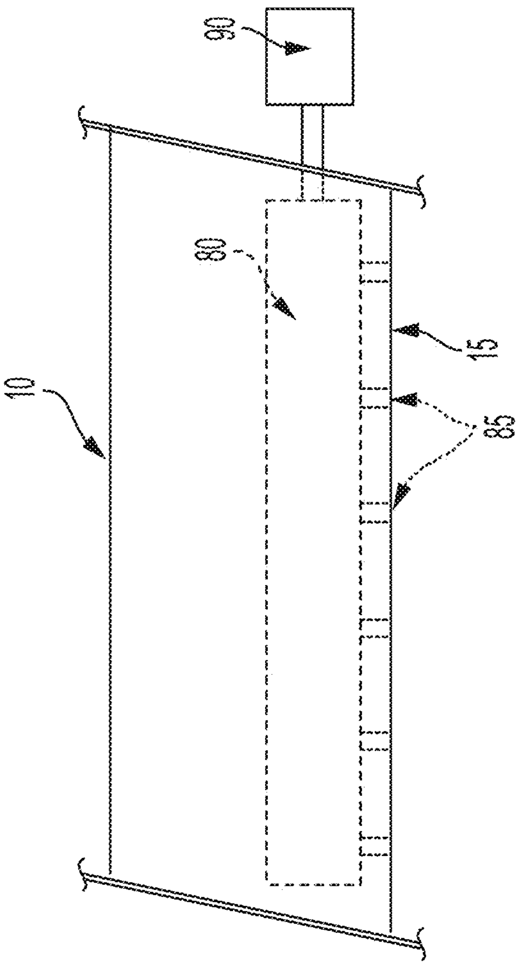
FIG. 28 is a schematic view showing a patient pad comprising a first region having at least one opening communicating with a source of at least one of suction and air pressure, according to various embodiments.

It should be appreciated that, if desired, patient pad 5 may be provided with stiffener 75, with or without providing at least one first region 40 having a higher coefficient of friction and at least one second region 45 have a higher coefficient of friction. More particularly, In some embodiments, patient pad 5 comprises top surface 10 for supporting a patient, and bottom surface 15 for engaging a support structure, wherein top surface 10 comprises foam, wherein bottom surface 15 comprises at least one of foam, a polymer sheet and a woven sheet, and further wherein patient pad 5 comprises stiffener 75 to resist bunching when patient pad 5 is subjected to a sliding force. In some embodiments, stiffener 75 preferably comprises a layer of material disposed between top surface 10 and bottom surface 15 of patient pad 5, although the layer of material could also be disposed alongside top surface 10 and/or bottom surface 15. In one preferred form of the invention, stiffener 75 comprises one or more semi-rigid materials, e.g., plastic sheets. Alternatively, where the patient pad is a composite comprising multiple layers, the desired stiffened effect may be achievable with selective stacking of the layers According to various embodiments, and looking now at FIG. 28, patient pad 5 comprises top surface 10 for supporting a patient, and bottom surface 15 for engaging a support structure, wherein bottom surface 15 comprises a first region 80 having at least one opening 85 communicating with a source 90 of at least one of suction and air pressure. During transport of the patient from a gurney to the surgical table, transport of the patient along the surgical table, and transport of the patient from the surgical table back onto a gurney, the at least one opening 85 of first region 80 communicates with a source 90 of air pressure so as to create an air cushion beneath bottom surface 15 of patient pad 5 and thereby facilitates transport of patient pad 5 (carrying the patient) along the support structure; and during stabilizing of the patient on the surgical table during a surgical procedure, the at least one opening 85 of first region 80 communicates with a source 90 of suction, so as to create an air grip beneath bottom surface 15 of patient pad 5 and thereby facilitate stabilizing patient pad 5 (carrying the patient) on the surgical table.

By way of example but not limitation, when the patient needs to be transported from a gurney to the surgical table, transported along the surgical table, and transported from the surgical table back onto a gurney, at least one opening 85 of first region 80 communicates with a source 90 of air pressure so as to create an air cushion beneath bottom surface 15 of patient pad 5, and thereby facilitates transport of 15 patient pad 5 (carrying the patient) along the support structure. Patient pad 5 (carrying the patient) is then slid along the support structure so as to facilitate transport of the patient. When the patient needs to be stabilized on the surgical table during a surgical procedure, at least one opening 85 of first region 80 communicates with a source 90 of suction, so as to create an air grip beneath bottom surface 15 of patient pad 5 and thereby facilitates stabilizing patient pad 5 (carrying the patient) on the surgical table.

Figure 29:
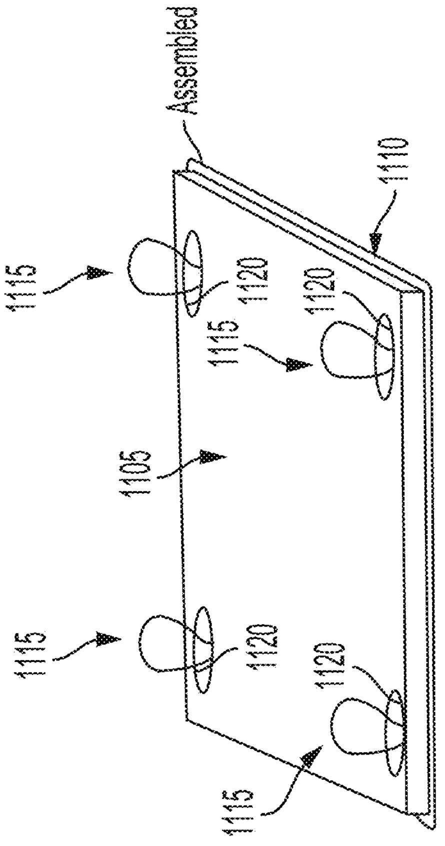
FIGS. 29 and 30 are schematic views showing a patient pad comprising a bottom element comprising at least two handles and a top element comprising at least two openings for passing the at least two handles therethrough, according to various embodiments.
Figure 30:
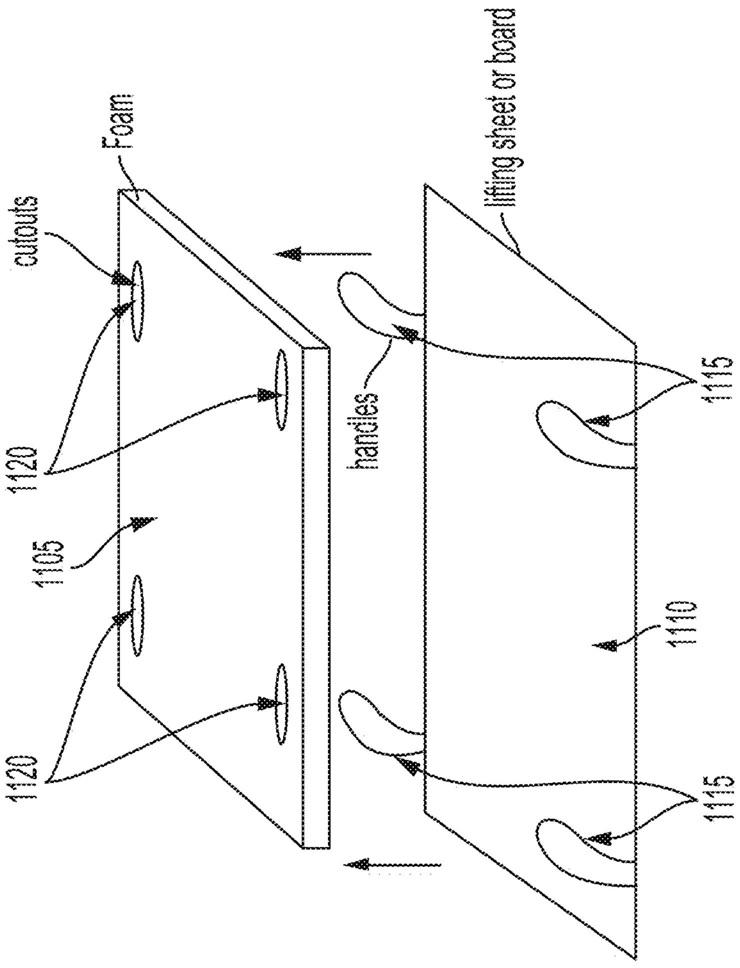

According to various embodiments, and looking now at FIGS. 29 and 30, a patient pad 5 comprises a top element 1105 for supporting a patient, and a bottom element 1110 for engaging a support structure, wherein bottom element 1110 comprises at least two handles 1115, wherein top element 1105 comprises at least two openings 1120 for passing the at least two handles 1115 therethrough, wherein top element 1105 can be disposed atop bottom element 1110 with the at least two handles 1115 extending through the at least two openings 1120, whereby patient pad 5 can be lifted as a unit by pulling upward on the two handles 1115.

Figure 31:
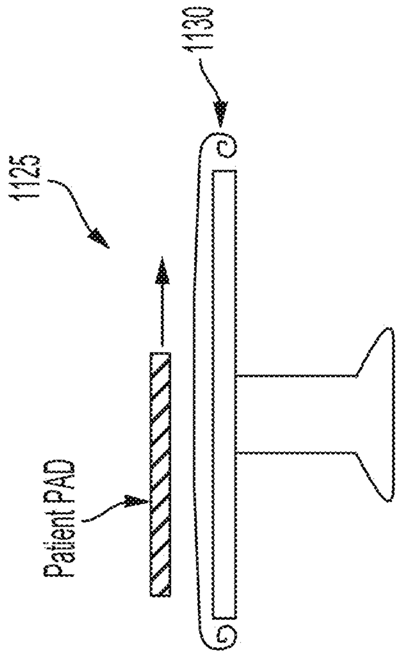
FIG. 31 and FIG. 32 are schematic views showing a patient support comprising a conveyor belt, according to various embodiments.
Figure 32:
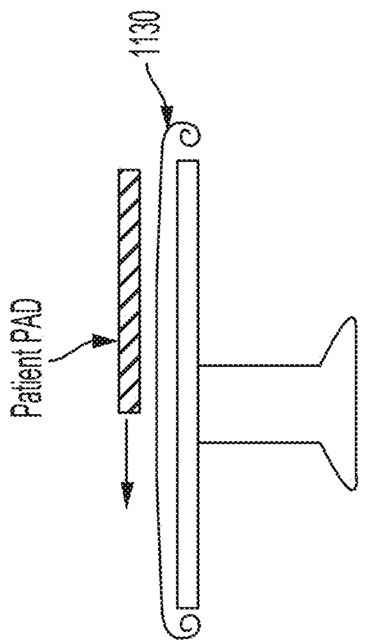

According to various embodiments, and looking now at FIGS. 31 and 32, a patient support 1125 comprises a conveyor belt 1130 for receiving a patient thereon and for moving the patient by rotation of conveyor belt 1130.

According to various embodiments, systems and methods include transporting a patient from a gurney to a surgical table, transporting the patient along the surgical table, stabilizing the patient on the surgical table during a surgical procedure, and transporting the patient off the surgical table and back onto a gurney at the conclusion of the surgical procedure. According to various embodiments, these systems and methods can use any of the slide-resisting pads described herein and can include a pad that includes a top surface for supporting a patient; and a bottom surface for engaging a support structure; wherein the bottom surface comprises: at least one first region having a higher coefficient of friction; and at least one second region having a lower coefficient of friction.

During transport of the patient from a gurney to the surgical table, transport of the patient along the surgical table, and transport of the patient from the surgical table back onto a gurney, the second region (having a lower coefficient of friction) engages the support structure (e.g., the gurney or the surgical table) and the first region (having a higher coefficient of friction) does not engage the support structure, whereby to facilitate transport of the patient by sliding the patient pad (carrying the patient) along the support structure; and during stabilizing of the patient on the surgical table during a surgical procedure, the first region (having a higher coefficient of friction) engages the support structure and the second region (having a lower coefficient of friction) may or may not engage the support structure (either fully or partially or not at all), whereby to facilitate stabilizing the patient on the surgical table by preventing sliding of the patient pad (carrying the patient) along the surgical table.

By way of example but not limitation, when the patient needs to be transported from a gurney to the surgical table, transported along the surgical table, and transported from the surgical table back onto a gurney, the patient pad is gripped alongside two or more of its edges and lifted so that the second region (having a lower coefficient of friction) engages the support structure (e.g., the gurney or the surgical table) and the first region (having a higher coefficient of friction) does not engage the support structure. The patient pad (carrying the patient) is then slid along the support structure so as to facilitate transport of the patient.

When the patient needs to be stabilized on the surgical table during a surgical procedure, the patient pad is not lifted along two or more of its edges so that the first region (having a higher coefficient of friction) engages the support structure and the second region (having a lower coefficient of friction) may or may not engage the support structure (either fully or partially or not at all), whereby to stabilize the patient on the surgical table by preventing sliding of the patient pad (carrying the patient) along the surgical table.

According to some embodiments, a patient pad includes: a top surface for supporting a patient; and a bottom surface for engaging a support structure; wherein the top surface comprises foam; wherein the bottom surface comprises at least one of foam, a polymer sheet and a woven sheet; and further wherein the patient pad comprises a stiffener to resist bunching when the patient pad is subjected to a sliding force.

According to some embodiments, a patient pad includes: a top surface for supporting a patient; and a bottom surface for engaging a support structure; wherein the bottom surface comprises: a first region having at least one opening communicating with a source of at least one of suction and air pressure. During transport of the patient from a gurney to the surgical table, transport of the patient along the surgical table, and transport of the patient from the surgical table back onto a gurney, the at least one opening of the first region communicates with a source of air pressure so as to create an air cushion beneath the bottom surface of the patient pad and thereby facilitate transport of the patient pad (carrying the patient) along the support structure; and during stabilizing of the patient on the surgical table during a surgical procedure, the at least one opening of the first region communicates with a source of suction, so as to create an air grip beneath the bottom surface of the patient pad and thereby facilitate stabilizing the patient pad (carrying the patient) on the surgical table.

By way of example but not limitation, when the patient needs to be transported from a gurney to the surgical table, transported along the surgical table, and transported from the surgical table back onto a gurney, the at least one opening of the first region communicates with a source of air pressure so as to create an air cushion beneath the bottom surface of the patient pad, and thereby facilitates transport of the patient pad (carrying the patient) along the support structure. The patient pad (carrying the patient) is then slid along the support structure so as to facilitate transport of the patient. When the patient needs to be stabilized on the surgical table during a surgical procedure, the at least one opening of the first region communicates with a source of suction, so as to create an air grip beneath the bottom surface of the patient pad and thereby facilitates stabilizing the patient pad (carrying the patient) on the surgical table.

According to some embodiments, a patient pad includes: a top element for supporting a patient; and a bottom element for engaging a support structure; wherein the bottom element comprises at least two handles; wherein the top element comprises at least two openings for passing the at least two handles therethrough; wherein the top element can be disposed atop the bottom element with the at least two handles extending through the at least two openings, whereby the patient pad can be lifted as a unit by pulling upward on the two handles.

According to some embodiments, a patient support includes: a conveyor belt for receiving a patient thereon and for moving the patient by rotation of the conveyor belt.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for hip distraction of a subject without the use of a perineal post, comprising:

positioning a patient pad on a surface of a patient support;

strapping the patient pad to the patient support using one or more straps of the patient pad;

positioning the subject on the patient pad such that buttocks of the subject are positioned proximate to at least one visual indicator on the surgical pad;

strapping each lower leg and foot of the subject into corresponding boots of a distraction system;

positioning the subject in a Trendelenburg position on the patient pad;

while the subject is in the Trendelenburg position, applying a traction force to at least an operative leg of the subject by moving a corresponding boot away from the patient support using the distraction system, thereby distracting an operative hip joint without the use of the perineal post; and reducing a degree of inclination of the subject on the patient pad while maintaining at least a portion of the traction force so as to perform at least a portion of a surgical procedure on the operative hip joint while the operative hip joint remains distracted.

2. The method of claim 1, wherein the one or more straps of the patient pad comprises at least two sets of straps, a first set of straps located at a proximal end of the patient pad, and a second set of straps located at a distal end of the patient pad.

3. The method of claim 1, wherein the one or more straps are strapped to one or more side rails of the patient support.

4. The method of claim 1, wherein positioning the subject on the patient pad comprises positioning at least shoulders and buttocks of the patient on the patient pad.

5. The method of claim 1, wherein skin of the subject is in direct contact with the patient pad.

6. The method of claim 1, wherein a sheet is disposed on the patient pad between the patient pad and the subject.

7. The method of claim 1, wherein positioning the subject in the Trendelenburg position includes tilting the patient support to a degree of inclination of up to 20 degrees.

8. The method of claim 1, wherein positioning the subject in the Trendelenburg position comprises tilting the patient support to a degree of inclination such that the subject does not slide when the operative hip joint is distracted.

9. The method of claim 7, wherein positioning the subject in the Trendelenburg position includes tilting the patient support to a degree of inclination that is selected based on characteristics of the subject and/or procedure type.

10. The method of claim 1, comprising imaging the operative hip joint to verify distraction of the operative hip joint.

11. The method of claim 1, wherein reducing the degree of inclination of the subject comprises returning the subject to a flat position.

12. The method of claim 1, wherein reducing the degree of inclination of the subject comprises positioning the subject in a second degree of inclination that is less than 20 degrees.

13. The method of claim 1, comprising further reducing the degree of inclination over time during the surgical procedure.

14. The method of claim 13, wherein further reduction of the degree of inclination is based on an observed reduction in the traction force applied to the subject during the surgical procedure.

15. The method of claim 1, wherein at least the boots of the distraction system remain stationary while the degree of inclination of the subject on the patient pad is reduced.

16. The method of claim 1, wherein a first portion of the surgical procedure is performed in a first degree of inclination, and a second portion of the surgical procedure is performed in a second degree of inclination.

17. The method of claim 16, wherein the second degree of inclination is less than the first degree of inclination.

18. The method of claim 1, wherein a first portion of the surgical procedure is performed with a first amount of distraction of the operative hip joint, and a second portion of the surgical procedure is performed with a second amount of distraction of the operative hip joint.

19. The method of claim 18, wherein the second amount of distraction is less than the first amount of distraction.

20. The method of claim 1, wherein the patient support is in a horizontal position when the subject is positioned on the patient pad.

21. The method of claim 1, wherein the surgical procedure comprises a minimally invasive procedure.

* * * * *